United States Patent
Inomoto et al.

(10) Patent No.: US 7,613,839 B2
(45) Date of Patent: Nov. 3, 2009

(54) METHOD AND APPARATUS FOR SETTING MASTER NODE OF RING NETWORK

(75) Inventors: Kazuyuki Inomoto, Yokohama (JP); Shinji Takao, Yokohama (JP); Yushi Nobayashi, Yokohama (JP); Masao Mutou, Yokohama (JP); Mineo Kotegawa, Yokohama (JP); Hiroaki Shiraishi, Yokohama (JP); Masaru Nishida, Yokohama (JP); Ichiro Kagami, Kawasaki (JP); Yoshinobu Takagi, Kawasaki (JP); Junichi Sawada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 861 days.

(21) Appl. No.: 10/856,653

(22) Filed: May 28, 2004

(65) Prior Publication Data

US 2005/0125501 A1    Jun. 9, 2005

(30) Foreign Application Priority Data

Dec. 5, 2003    (JP) ............................. 2003-407712

(51) Int. Cl.
*G06F 15/16* (2006.01)
*G06F 15/173* (2006.01)
*G06F 15/177* (2006.01)

(52) U.S. Cl. ...................... 709/251; 709/221; 709/223; 709/242

(58) Field of Classification Search .................. 709/208, 709/235, 251, 242, 223, 221; 370/216–218, 370/258

See application file for complete search history.

(56) References Cited

U.S. PATENT DOCUMENTS

| 5,003,533 | A | * | 3/1991 | Watanabe | 370/258 |
|---|---|---|---|---|---|
| 5,506,838 | A | * | 4/1996 | Flanagan | 370/258 |
| 5,778,188 | A | * | 7/1998 | Taniguchi et al. | 709/236 |
| 5,870,387 | A | * | 2/1999 | Mulla | 370/258 |
| 5,923,646 | A | * | 7/1999 | Mandhyan | 370/254 |
| 6,373,826 | B1 | * | 4/2002 | Russell et al. | 370/256 |
| 6,510,141 | B1 | * | 1/2003 | Ramfelt et al. | 370/254 |
| 6,717,922 | B2 | * | 4/2004 | Hsu et al. | 370/258 |
| 6,950,855 | B2 | * | 9/2005 | Sampathkumar | 709/209 |
| 7,054,951 | B1 | * | 5/2006 | Kao et al. | 709/242 |
| 7,286,490 | B2 | * | 10/2007 | Saleh et al. | 370/254 |
| 7,349,351 | B2 | * | 3/2008 | Shachnai et al. | 370/255 |
| 2002/0141334 | A1 | * | 10/2002 | Deboer et al. | 370/227 |
| 2002/0186667 | A1 | * | 12/2002 | Mor et al. | 370/258 |
| 2006/0080417 | A1 | * | 4/2006 | Boutboul et al. | 709/220 |
| 2006/0155778 | A1 | * | 7/2006 | Sharma et al. | 707/201 |

FOREIGN PATENT DOCUMENTS

| JP | 1-164146 | 6/1989 |
|---|---|---|
| JP | 2002-171268 | 6/2002 |

* cited by examiner

*Primary Examiner*—Kevin Bates
(74) *Attorney, Agent, or Firm*—Katten Muchin Rosenman LLP

(57) ABSTRACT

A method is disclosed for setting a master node of a ring network that has adjacently connected nodes situated on rightward and leftward lines of a bidirectional transmission channel. The method includes the steps of: counting the number of nodes interposed between a designated node and each node other than the designated node on the rightward and leftward lines of the bidirectional transmission channel; and setting one of the nodes as the master node. The master node satisfies a relation of, NHC_L=NHC_R or NHC_L=NHC_R-1, wherein NHC_L is the number of interposed nodes counted from the leftward line, and NHC_R is the number of interposed nodes counted from the rightward line.

5 Claims, 22 Drawing Sheets

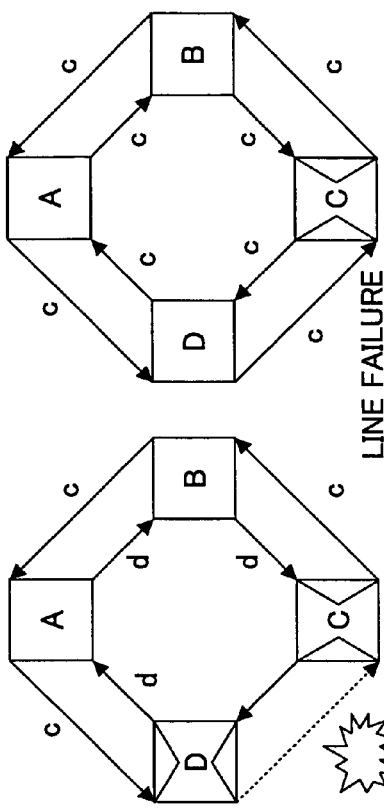

RING NETWORK

BASIC CONFIGURATION

WHEN OPERATING AS INTERMEDIARY STATION

WHEN OPERATING AS END STATION

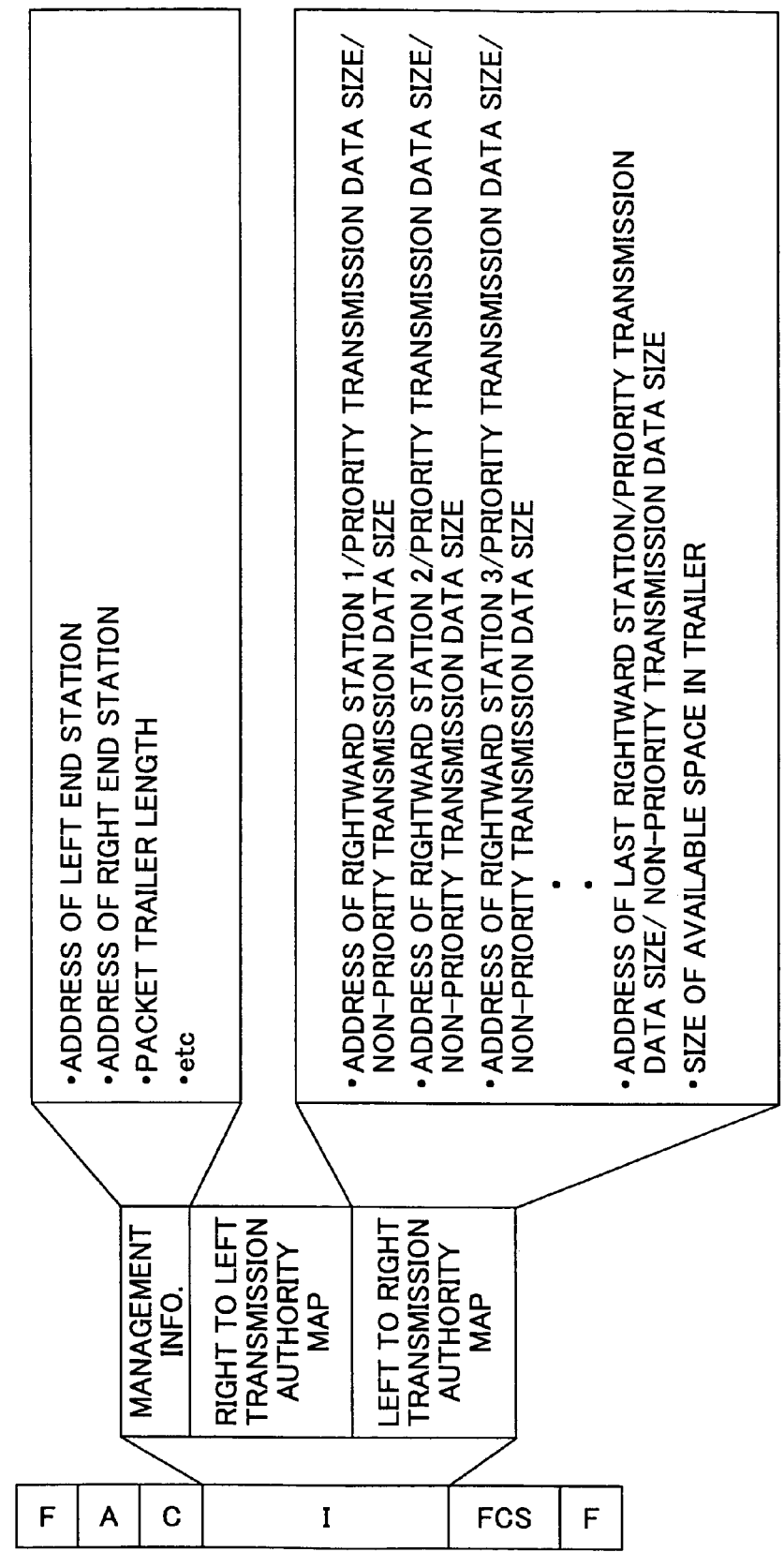

METHOD AND APPARATUS FOR SETTING MASTER NODE OF RING NETWORK

BACKGROUND OF THE INVENTION

1. Field of the Invention

The present invention generally relates to a method and apparatus for setting a master node of a ring network, more particularly, to a method and apparatus for setting a master node of a ring network having a RAS (Reliability, Availability, Serviceability) function that adaptively switches interconnection channels during failure.

2. Description of the Related Art

The IP (Internet Protocol) network, performing various kinds of data communication, is basically structured with a mesh topology. It is, however, not always best to employ the mesh topology for a network. For example, for a network for monitoring bidirectional communications between a plurality of stations in a limited area (e.g. road, river), a linear type or a ring type network may be efficiently used. It is to be noted that ring networks having a RAS function include a serial transmission type and a loop back transmission type.

For example, in Japanese Examined Patent Application No.7-52886 and Japanese Laid-Open Patent Application No.2002-171268, the inventor of the present invention proposes a method and apparatus for setting a master node of a linear or a ring network that is able to fully utilize the transmission capacity of a bidirectional transmission channel for efficiently transmitting data, and to simultaneously perform data communications between plural nodes without causing delay in data transmission.

FIGS. 1A and 1B are drawings for describing an exemplary structure of a ring network. For example, in the ring network shown in FIG. 1A, node A, among random nodes, is an end station (master node) and the remaining nodes B through D are intermediary stations (slave nodes), wherein each of the nodes is connected to an adjacent node with a bidirectional transmission channel. The ring network shown in FIG. 1A is, logically, equal to the linear structure shown in FIG. 1B.

In FIGS. 1A and 1B, the node (end station) A operates as left and right end stations. The left and right end stations generate a packet trailer that includes a token packet (including transmission authority information), and data packet storage space. The left end station transmits the packet trailer in the rightward direction of the transmission channel, and the right end station transmits the packet trailer in the leftward direction of the transmission channel (line). In requesting a data packet (information) to be transmitted in the rightward direction, each intermediary station writes information requesting the transmittal of the data packet onto the token packet in the packet trailer heading leftward on the leftward transmission channel, and in requesting a data packet (information) to be transmitted in the leftward direction, each intermediary station writes information requesting the transmittal of the data packet onto the token packet in the packet trailer heading rightward in the rightward transmission channel (line).

Based on the information written onto the token packet in the packet trailer sent from an oppositely situated end station, each of the right and left end stations generates a packet trailer having data packet storage space reserved for the intermediary station that has requested transmittal of the data packet. The intermediary station having requested the transmittal of the data packet (information) stores the data packet in the reserved space in the packet trailer, and transmits the packet trailer containing the data packet to a destination node.

An operation of a conventional ring network, in a case where there is a failure in a line of the network, is described with reference to FIGS. 2A through 2D. As shown in FIG. 2A, when the ring network is in a normal state, node A operates as the end station (master node), and the remaining nodes B through D operate as intermediary stations (slave nodes). When there is a failure between nodes C and D as shown in FIG. 2B, nodes C and D, having the failure therebetween, operate as end stations (See FIG. 2C). After communication is restored, either one of the nodes C or D operates as the end station as shown in FIG. 2D (in this example, node C).

It is to be noted that, conventionally, in handling information for distinguishing transition of the nodes, a part of the bandwidth of both rings is fixedly allocated, and a dedicated band which is logically different from the main signal is used. With the conventional example, the master node moves during operation, and is unable to have a fixed position in the network.

In a network where traffic runs evenly throughout the nodes, the position of the master node causes no decrease in transmission efficiency. However, in a network where reception traffic is concentrated on a particular node, the position of the master node may decrease transmission efficiency.

In a normal operation state of a ring network, packets can be transmitted in both left and right directions. Accordingly, transmission efficiency is greatly affected by the position of the master node which performs arbitration. In a case where reception traffic is concentrated on a particular node, excellent performance can be attained when the particular node is situated furthest from the master node.

The differences in transmission efficiency in relation to the position of the master node are described with reference to FIGS. 3 through 5. Since the ring network is illustrated in a spread-out manner, node #1, which is the master node, is illustrated on both ends of the network.

In the ring network shown in FIG. 3, a once-used band will not be available until terminating at the master node. Normally, communication from one node to another is performed evenly on a substantially same band, and the total of the communications is equal to the bandwidth of the transmission channel.

As shown in FIG. 4, in a case where the reception traffic from nodes #1 through #7, #9 and #10 is concentrated on node #8, all of the bands of the lines in the rightward direction are used while there are still bands available in the leftward direction. Therefore, in a case, for example, where nodes #6 and #7 to node #8 request communication, neither can the nodes #6 and #7 to node #8 perform communication nor can the total amount of communication be increased since all of the bands of the lines in the rightward direction are occupied. This is because the packet trailer is generated and sent by the node #1 (master node), and thus terminates at the node #1. Accordingly, although there are bands remaining in the leftward direction, the bands cannot be used. This occurs most notably when the node to which the reception traffic is concentrated (in this example, node #8) is situated other than a position furthest from the master node (in this example, node #1).

On the other hand, as shown in FIG. 5, in a case where the reception traffic from nodes #1 through #5, and nodes #7 through #10 is concentrated on node #6, the bands of the lines in both left and right directions can be efficiently used when the node to which the reception traffic is concentrated (in this example, node #6) is situated at a position furthest from the master node (in this example, node #1).

The foregoing description of the conventional network shows that ① transmission efficiency significantly differs depending on the position with respect to the master node, (2) an excellent transmission performance can be attained when the node to which the reception traffic is concentrated is situated at a position furthest from the master node, (3) the master node moves during operation and cannot have a fixed position in the network. Accordingly, in the conventional network where there is a concentration of reception traffic, the network may be subjected to a decrease in transmission efficiency due to the position of the master node.

SUMMARY OF THE INVENTION

It is a general object of the present invention to provide a method and an apparatus for setting a master node of a ring network that substantially obviate one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by a method and an apparatus for setting a master node of a ring network particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a method of setting a master node of a ring network that has adjacently connected nodes situated on rightward and leftward lines of a bidirectional transmission channel, the method comprising the steps of: counting the number of nodes interposed between a designated node and each node other than the designated node on the rightward and leftward lines of the bidirectional transmission channel; and setting one of the nodes as the master node; wherein the master node satisfies a relation of, NHC_L=NHC_R or NHC_L=NHC_R-1, wherein NHC_L is the number of interposed nodes counted from the leftward line, and NHC_R is the number of interposed nodes counted from the rightward line.

According to the method of an embodiment of the present invention, the designated node may be a node at which reception traffic is concentrated.

Furthermore, the present invention provides a node apparatus in a ring network that has adjacently connected node apparatuses situated on rightward and leftward lines of a bidirectional transmission channel, the node apparatus comprising: a counting unit for counting the number of node apparatuses interposed between the node apparatus and a designated node apparatus on the rightward and leftward lines of the bidirectional transmission channel; and a master node setting unit for setting the node apparatus as the master node; wherein the master node satisfies a relation of, NHC_L=NHC_R or NHC_L=NHC_R-1, wherein NHC_L is the number of interposed node apparatuses counted from the leftward line, and NHC_R is the number of interposed node apparatuses counted from the rightward line.

According to the apparatus of an embodiment of the present invention, the designated node apparatus is a node apparatus at which reception traffic is concentrated.

According to the apparatus of an embodiment of the present invention, the designated node apparatus may have a control packet generation unit for generating a control packet indicating that the number of interposed node apparatuses for both rightward and leftward lines is 0, and transmitting the control packet to the rightward and leftward lines of the bidirectional transmission channel.

According to the apparatus of an embodiment of the present invention, each node apparatus may have a control packet transmitting unit for incrementing a value of 1 to the number of interposed node apparatuses of the control packet received from the rightward and leftward lines, and transmitting the incremented control packet to the rightward and leftward lines.

According to the apparatus of an embodiment of the present invention, the master node setting unit may set the node apparatus as the master node when the number of interposed node apparatuses is equal to or more than a prescribed value.

Other objects and further features of the present invention will be apparent from the following detailed description when read in conjunction with the accompanying drawings.

BRIEF DESCRIPTION OF THE DRAWINGS

FIGS. 2A through 2D are schematic diagrams for explaining the operation of a conventional ring network when failure occurs in a line of the network;

FIG. 14 is a schematic diagram showing an exemplary structure of a token packet;

DESCRIPTION OF THE PREFERRED EMBODIMENTS

In the following, embodiments of the present invention are described with reference to the accompanying drawings.

Figure 1A:
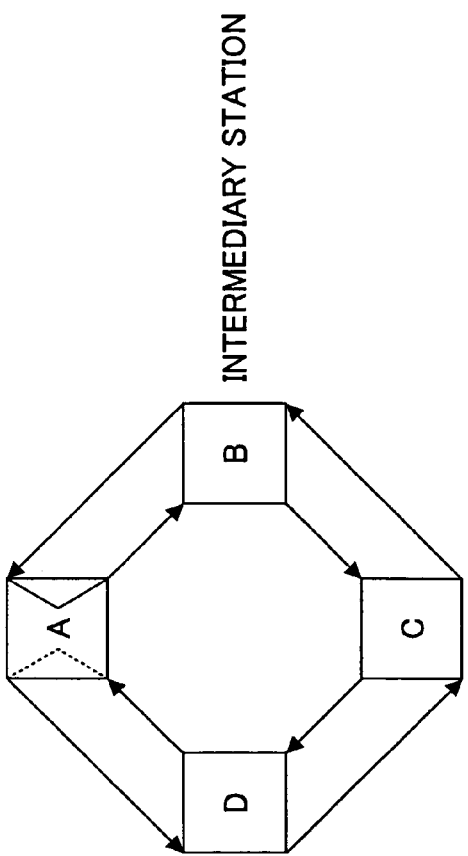
FIGS. 1A and 1B are schematic diagrams showing an exemplary structure of a ring network.
Figure 1B:
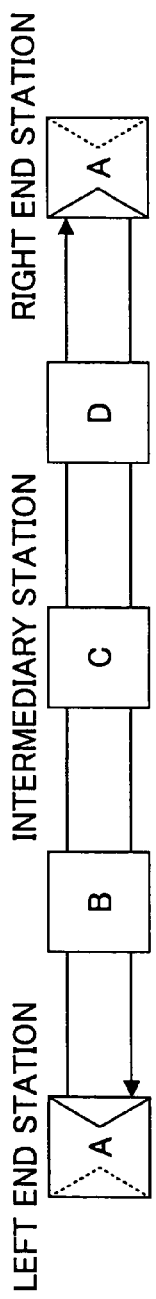
Figure 3:
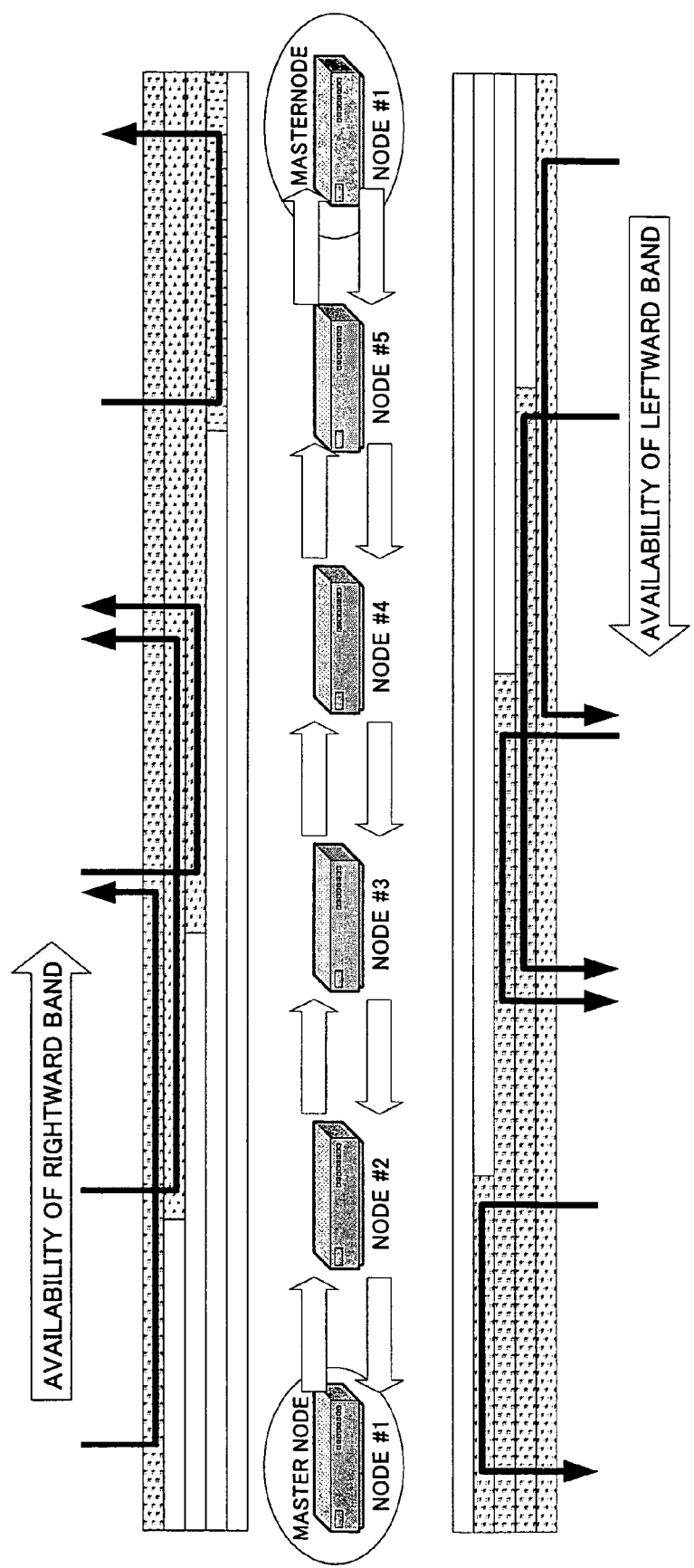
FIG. 3 is a schematic diagram for explaining the difference in transmission efficiency depending on the position of a master node.
Figure 4:
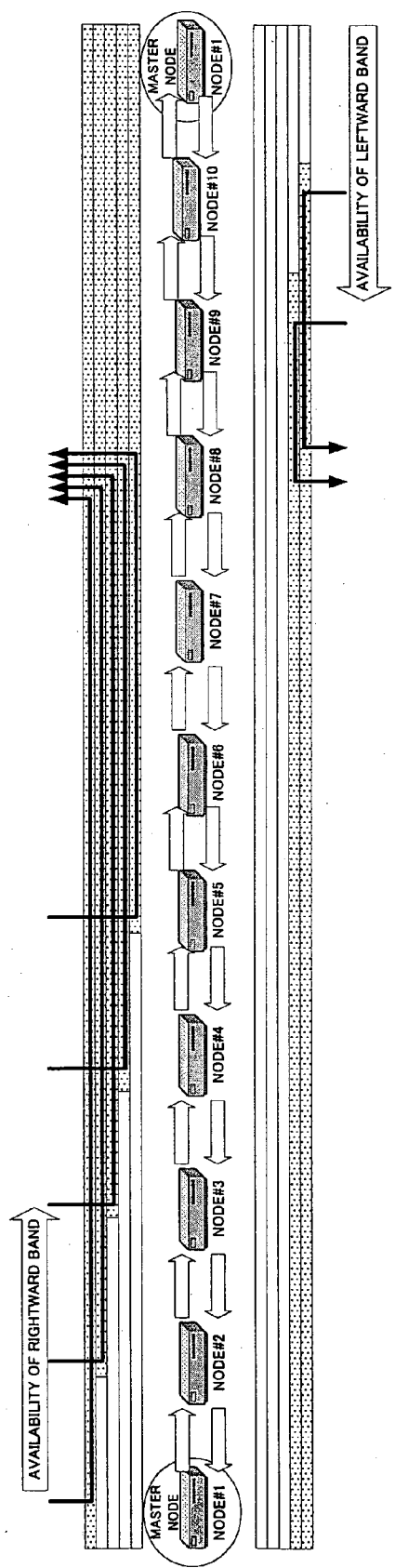
FIG. 4 is another schematic diagram for explaining the difference in transmission efficiency depending on the position of a master node.
Figure 5:
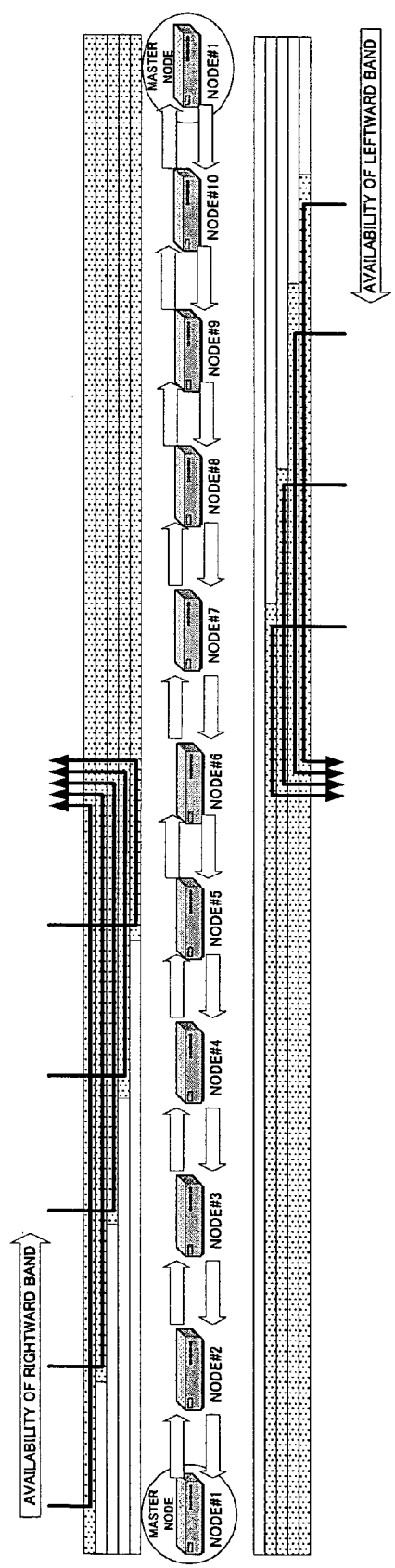
FIG. 5 is another schematic diagram for explaining the difference in transmission efficiency depending on the position of a master node.
Figure 6A:
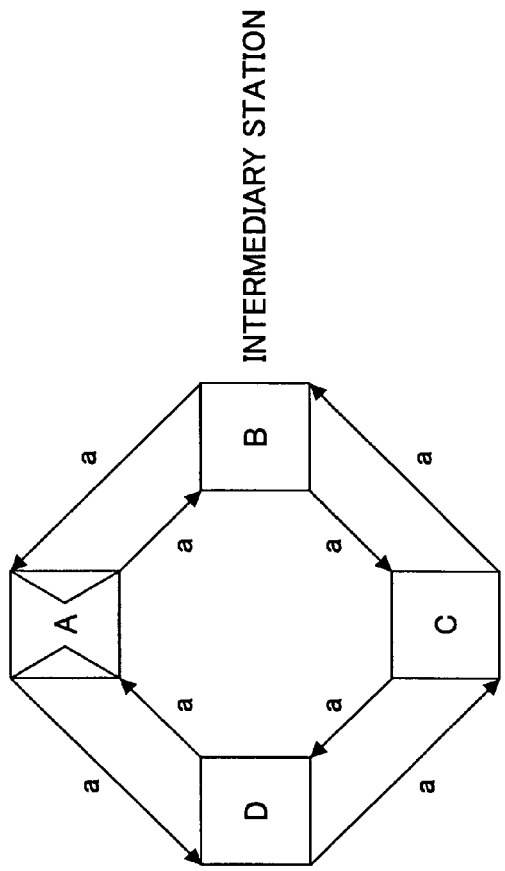
FIGS. 6A and 6B are schematic diagrams showing an exemplary structure of a ring network according to an embodiment of the present invention.
Figure 6B:
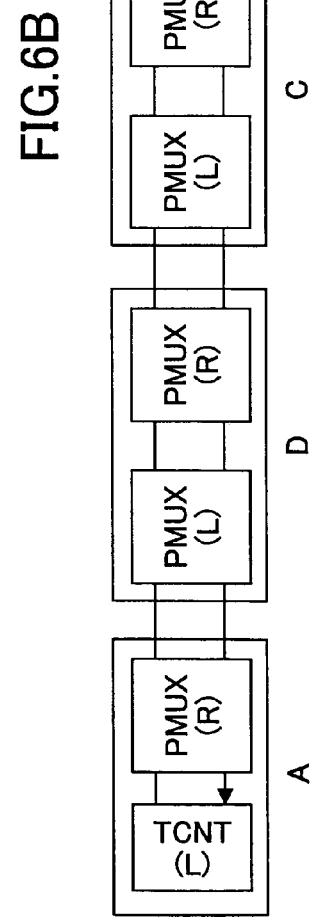

FIGS. 6A and 6B show an exemplary structure of a ring network according to an embodiment of the present invention. In the ring network shown in FIG. 6A, node A, among random nodes, is the end station and the remaining nodes B through D are intermediary nodes, wherein each of the nodes is connected to an adjacent node with a bidirectional transmission channel. The node A operating as the left and right end stations, issues a token packet that grants a transmission authority, and a master notification frame "a" indicating that node A is operating as the end station (master node).

FIG. 6B shows an exemplary logical communication line of the ring network shown in FIG. 6A. Each of the nodes A through D has a left packet multiplex part (PMUX (L)) and a right packet multiplex part (PMUX (R)). The right packet multiplex part (PMUX (R)) of the left end station and the left packet multiplex part (PMUX (L)) of the right end station are connected to a token controller TCNT, and the left and right packet multiplex parts (PMUX (L), PMUX (R)) of the intermediary stations are respectively connected to the right and left packet multiplex parts (PMUX (R), PMUX (L)) of adjacent nodes, thereby, relaying packet data in both directions.

Figure 7A:
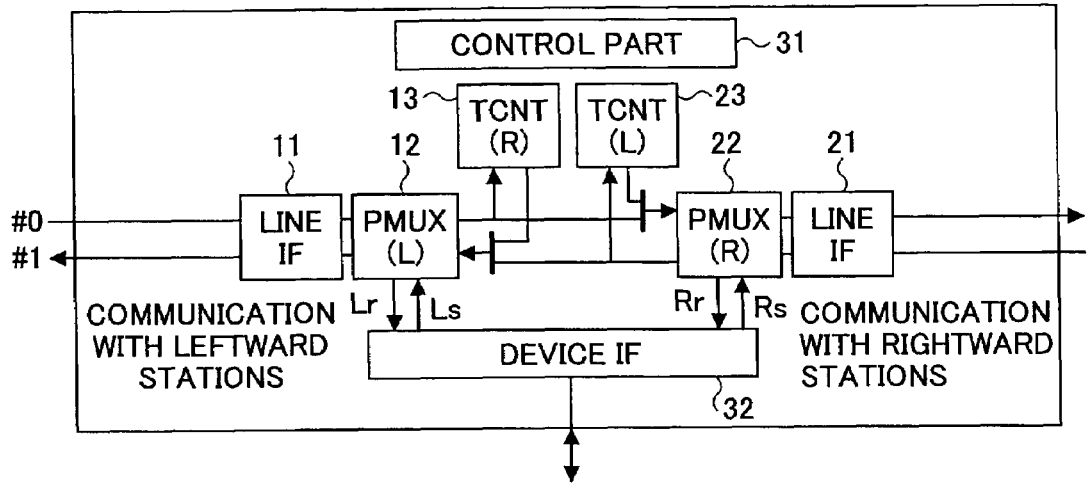
FIGS. 7A through 7C are block diagrams showing an exemplary structure of a transmission apparatus of each node according to an embodiment of the present invention.
Figure 7B:
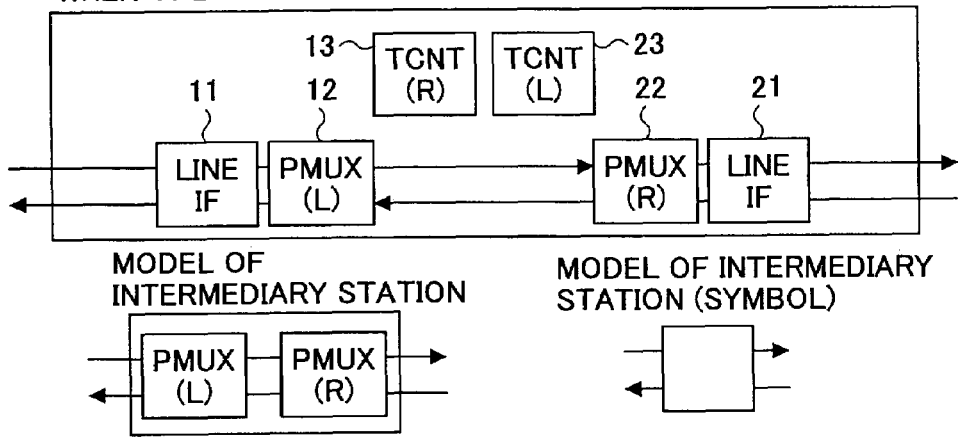
Figure 7C:
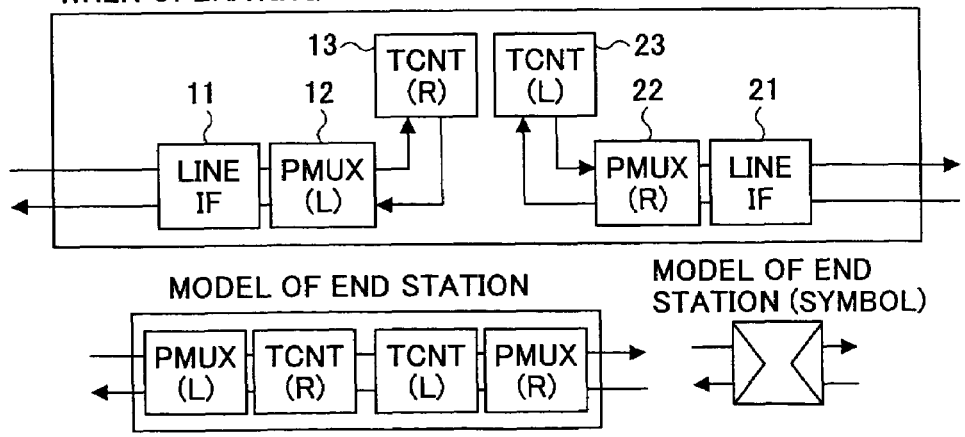

FIGS. 7A through 7C shows an exemplary structure of a transmission apparatus for each node according to an embodiment of the present invention. The basic structure of the transmission apparatus according to an embodiment of the present invention includes a left line interface 11, a right line interface 21, a left packet multiplex part (PMUX (L)) 12, a right packet multiplex part (PMUX (R)) 22, a right token controller (TCNT (R)) 13, a left token controller (TCNT (L)) 23, a control part (CNT) 31, and a terminal interface 32.

The left and right line interfaces 11, 21, respectively, have an interface function with respect to the signals of a right direction transmission channel #0 and a left direction transmission channel #1, and are connected to the left packet multiplex part (PMUX (L)) 12 and the right packet multiplex part (PMUX (R)) 22 for relaying the signals.

The left packet multiplex part (PMUX (L)) 12 not only outputs the packets of the right direction transmission channel #0 output from the left line interface 11 to the terminal interface 32, but also outputs the packets to the right token controller (TCNT (R)) 13 when the transmission apparatus is the end station, and to the right packet multiplex part (PMUX (R)) 22 when the transmission apparatus is the intermediary station.

Furthermore, the left packet multiplex part (PMUX (L)) 12, along with outputting the packets from the terminal interface 32, multiplexes the packets from the right token controller (TCNT (R)) 13 when the transmission apparatus is the end station, and the packets from the right packet multiplex part (PMUX (R)) 22 when the transmission apparatus is the intermediary station, to the left line interface 11.

The right packet multiplex part (PMUX (R)) 22 not only outputs the packets of the left direction transmission channel #1 output from the right line interface 21 to the terminal interface 32, but also outputs the packets to the left token controller (TCNT (L)) 23 when the transmission apparatus is the end station, and to the left packet multiplex part (PMUX (L)) 12 when the transmission apparatus is the intermediary station.

Furthermore, the right packet multiplex part (PMUX (R)) 22, along with outputting the packets from the terminal interface 32, multiplexes the packets from the left token controller (TCNT (L)) 23 when the transmission apparatus is the end station, and the packets from the left packet multiplex part (PMUX (L) 12 when the transmission apparatus is the intermediary station, to the right line interface 21.

FIG. 7B shows a case when the transmission apparatus operates as the intermediary station, wherein the left packet multiplex part (PMUX (L)) 12 and the right packet multiplex part (PMUX (R)) 22 are directly connected, and wherein the right token controller (TCNT (R)) 13 and the left token controller (TCNT (L)) 23 are disconnected. It is to be noted that a figure symbolizing the intermediary station is illustrated at the bottom part of FIG. 7B.

FIG. 7C shows a case when the transmission apparatus operates as the end station, wherein the left packet multiplex part (PMUX (L)) 12 is connected to the right token controller (TCNT (R)) 13, and wherein the right packet multiplex part (PMUX (R)) 22 is connected to the left token controller (TCNT) (L)) 23. It is to be noted that a figure symbolizing the end station is illustrated at the bottom part of FIG. 7C.

Figure 8A:
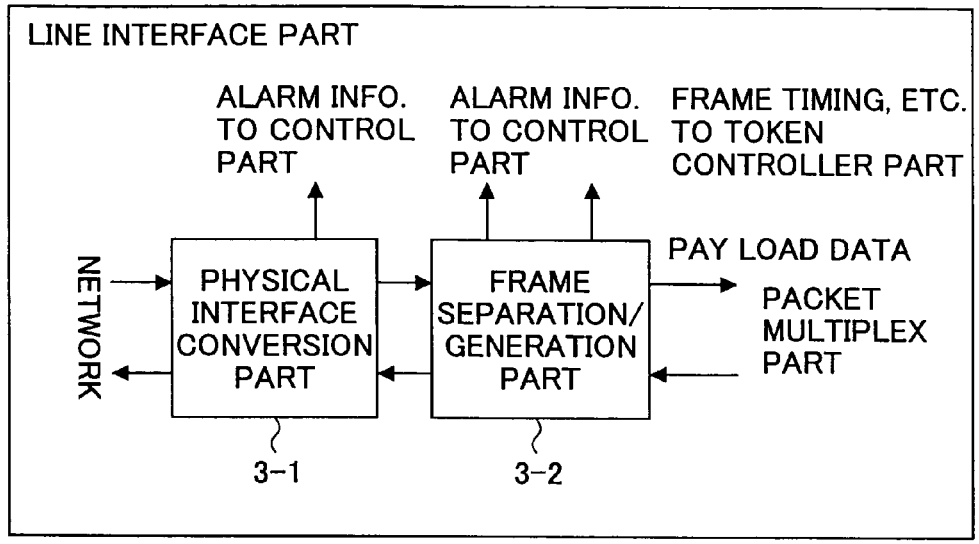
FIGS. 8A and 8B are block diagrams showing an exemplary structure of a line interface and a token controller (TCNT)
Figure 8B:
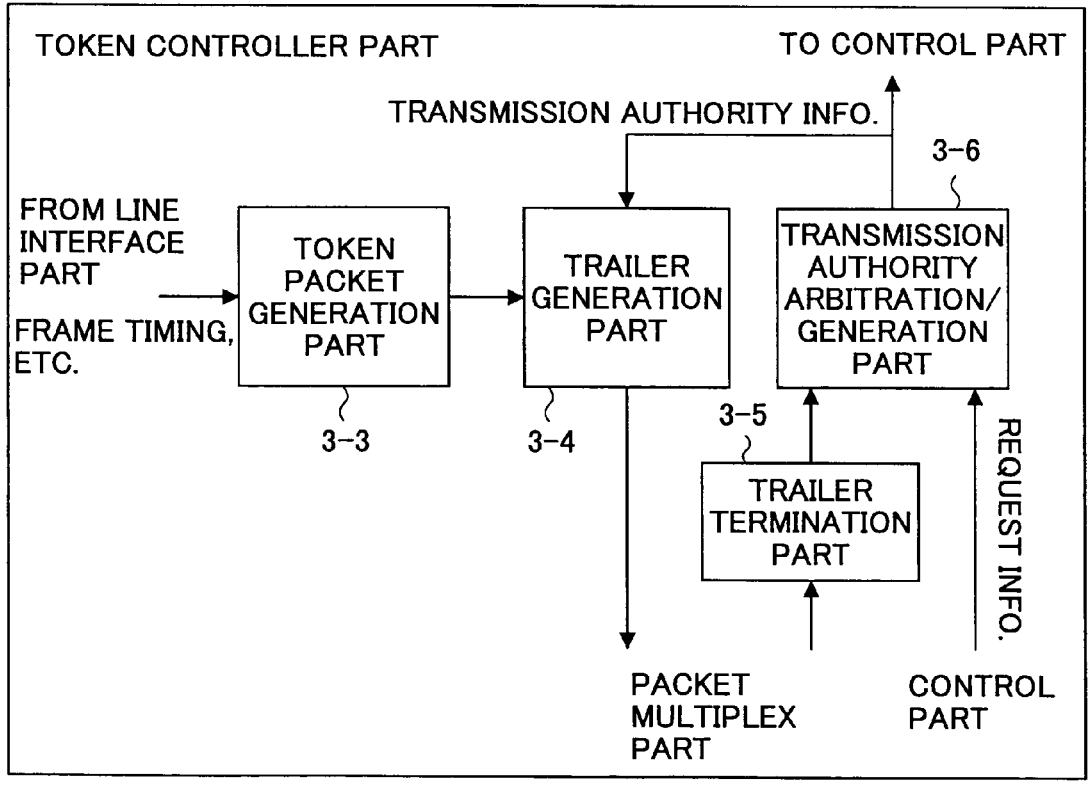

FIG. 8A shows an exemplary structure of a line interface part, and FIG. 8B shows an exemplary structure of a token controller (TCNT). In FIG. 8A, the line interface part has interface functions corresponding to respective network transmission lines. Further, the line interface part has an input part for inputting signals from the network transmission lines, and an output part for outputting signals to the network transmission lines. Further, the line interface part has a physical interface conversion part 3-1 corresponding to the network transmission lines.

The physical interface conversion part 3-1 monitors the alarm signals of the physical layer, and sends alarm information to the control part (CNT) when detecting an alarm signal from of the physical layer. A separation part of a frame separation/generation part 3-2 receives packets from the physical interface conversion part 3-1, removes headers, frame signals and the like corresponding to the protocol of the network transmission channel from the packets, and delivers only communication data (payload data) to the packet multiplex part (PMUX).

Furthermore, the separation part of the frame separation/generation part 3-2 likewise monitors alarm signals in the packets, and sends alarm information to the control part (CNT) when detecting an alarm signal. When the control part (CNT) receives the alarm information (e.g. abnormality of the received frame, abnormality of transmission), the control part (CNT) determines whether the transmission apparatus of the node is to operate as the intermediary station or the end station in accordance with a prescribed rule (described below).

A generation part of the frame separation/generation part 3-2 configures frames (packet frames) by adding headers and the like, corresponding to the network transmission lines, to the packets output from the packet multiplex part (PMUX), and delivers the packet frames to the physical interface conversion part 3-1.

In FIG. 8B, the token controller (TCNT), which operates upon the transmission apparatus serving as the end station, has a token packet (TP) timing generation part 3-3, a trailer generation part 3-4, a trailer termination part 3-5, and a transmission authority arbitration/generation part 3-6.

The token packet (TP) timing generation part 3-3 generates a transmission timing signal for transmitting a token packet (TP) based on the frame timing signals from the line interface part, and outputs the timing signal to the trailer generation part 3-4.

At a timing in accordance with the timing signals, the trailer generation part 3-4, based on transmission authority information transmitted from the transmission authority arbitration/generation part 3-6, generates a packet trailer including the token packet (TP) that grants transmission authority, and transmits the packet trailer to the packet multiplex part (PMUX).

The trailer termination part 3-5 terminates after receiving the packet trailer, being transmitted from an opposite other end station via the network transmission channel and being stored with transmission authority request information and transmission data packets from each node, via the packet multiplex part (PMUX). After sending the transmission authority request information from each intermediary station (node), which is stored in the packet trailer, to the transmission authority arbitration/generation part 3-6, the trailer termination part 3-5 discards all of the packet trailers.

Figure 9:
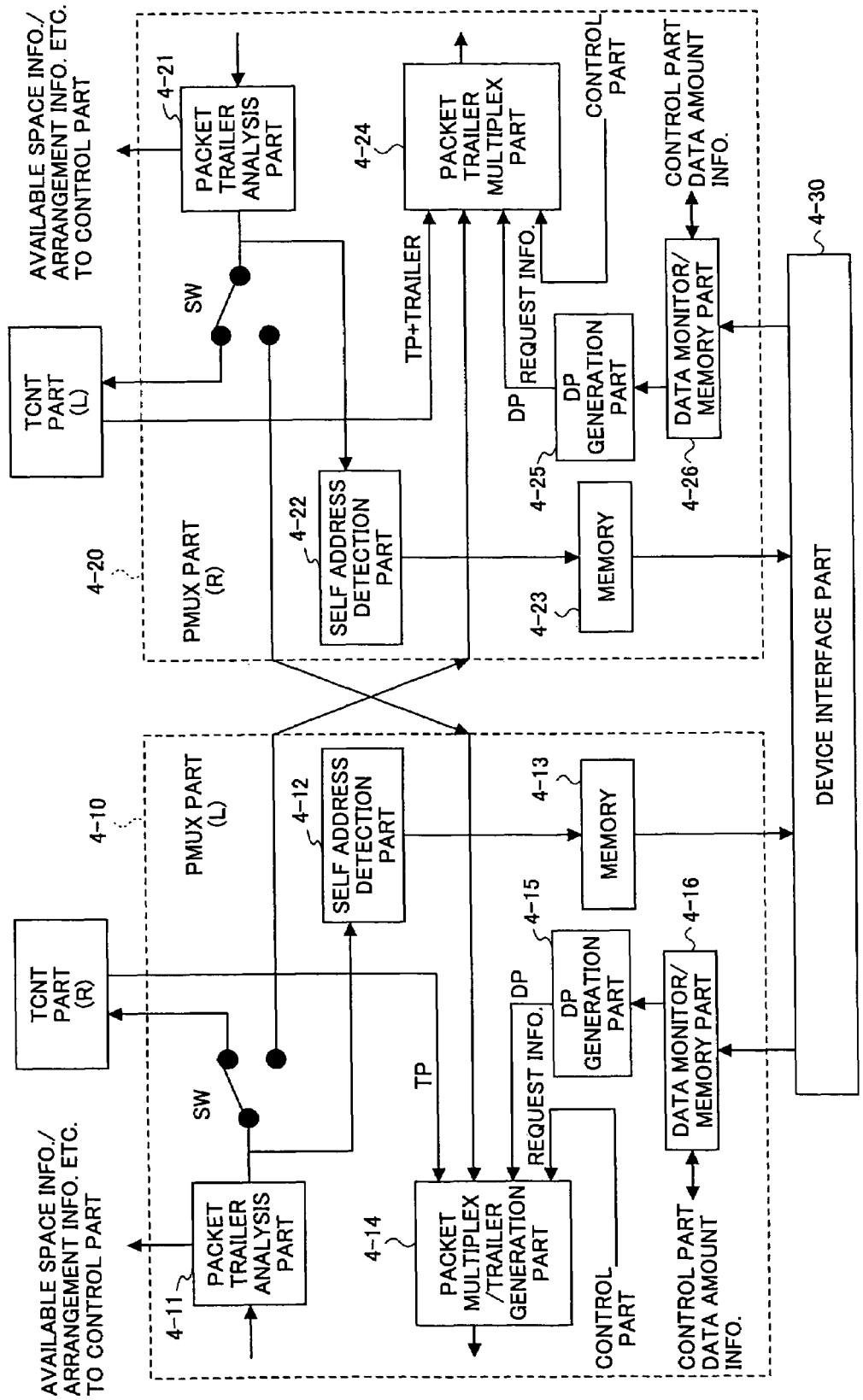
FIG. 9 is a block diagram showing an exemplary structure of a packet multiplex part (PMUX)

The transmission authority arbitration/generation part 3-6 issues a transmission authority (token) and performs arbitration based on the transmission authority request information of each intermediary station (node) provided by the trailer termination part 3-5, and the data transmission request information provided by the control part (CNT), and then provides the trailer generation part 3-4 the transmission authority information regarding the transmission authority of each node. FIG. 9 shows an exemplary structure of the packet multiplex part (PMUX). The transmission apparatus of each node is a dual packet multiplex part (PMUX) that includes the left packet multiplex part (PMUX (L)) 4-10 and the right packet multiplex part (PMUX (R)) 4-20. FIG. 9 illustrates the connecting relation of the dual packet multiplex part.

In the left packet multiplex part (PMUX (L)) 4-10 and right packet multiplex part (PMUX (R)) 4-20, packet trailer analyzing parts 4-11 and 4-21, respectively, obtain various information items in the data of the packet trailer input from the line interface part 4-30.

The obtained information includes, for example, information on the space available for storing data packets, information on accepting reservations for transmission authority, information on the arrangement of each node on the network transmission channel, and/or information for various controls. The packet trailer analyzing parts 4-11 and 4-21 analyze and extract information from the foregoing information, and report the extracted information to the control part (CNT).

After passing the packet trailer analyzing parts 4-11 and 4-22, the data in the packet trailer are output from switches SW to the token controllers (TCNT (R), TCNT (L)) in a case of end station operations, and to the packet multiplex parts (PMUX) of other systems in a case of intermediary station operations.

The control part (CNT) controls the switches SW. The control part (CNT), based on, for example, alarm information reported from the line interface, determines whether the transmission apparatus is to operate as the end station (master node) or as the intermediary station (slave node) in accordance with a prescribed rule (described below). According to the determination, the control part (CNT) switches the switches SW toward the side of the token controls (TCNT (R), TCNT (L)) when operating as the end station (master node), and toward the packet multiplex parts (PMUX) of other systems when operating as the intermediary station (slave node).

The self address detection part 4-12, 4-22 detects data packets that are addressed to itself from the packet trailer, copies the packets, and transmits the packets to the device interface part 4-30 via the memory 4-13, 4-23.

In operating as the end station (master node), the packet trailers output from the packet multiplex parts (PMUX (L) 4-10, PMUX (R) 4-20) are delivered to and discarded at the token controllers (TCNT (R), TCNT (L)), respectively. The token packets (TP) issued by the token controllers (TCNT (R), TCNT (L)) are respectively input in the packet multiplex trailer generation parts 4-14 and 4-24.

The packet multiplex trailer generation part 4-14, 4-24 multiplexes: the data packets (DP), being the data from the device interface part 4-30 formed into packets at the data packet generation part 4-15, 4-25; the token packets from the token controller (TCNT (R), TCNT (L)) or the packet trailers from the packet multiplex part (PMUX) of the other system; and the request information output from the control part (CNT). Then, the packet multiplex trailer generation part 4-14, 4-24 generates and transmits the packet trailers to the line interface.

It is to be noted that the amount of data transmitted from the device interface part 4-30 is measured at the data monitor/memory part 4-16, 4-26, and the amount is reported to the control part (CNT). The control part (CNT), based on the amount of data, generates transmission authority request information, and inputs the generated transmission request information to the packet multiplex trailer generation part 4-14, 4-24 in a direction opposite to the data transmission direction.

In operating as the end station (master node), the packet multiplex trailer generation part 4-14, 4-24 stores the token packet (TP) output from the token controller (TCNT) at the header of the the packet trailer, and multiplexes the data packet (DP) output from the data packet generation part 4-15, 4-25 at a succeeding data packet storage space in accordance with the instructions from the control part (CNT).

In operating as the intermediary station (slave node), the packet multiplex trailer generation part 4-14, 4-24 selects the packet trailer output from the packet multiplex part (PMUX) of the other system, and multiplexes transmission authority request information including the data amount measured at the opposite data amount monitor/memory part 14-16, 14-26 with the token packet (TP) and the data packet (DP) included in the trailer.

The control part (CNT) determines whether to transmit transmission data from its own node based on the information on the space available for storing data packets and the information on accepting reservations for transmission authority reported from the packet trailer analysis part 4-11, 4-21, and the information on the amount of transmitted data reported from the data monitor/memory part 4-16, 4-26. If the control part (CNT) determines that transmission is possible, the control part (CNT) instructs the packet multiplex trailer generation part 4-14, 4-24 to multiplex the data packet (DP) from its own node.

Figure 10:
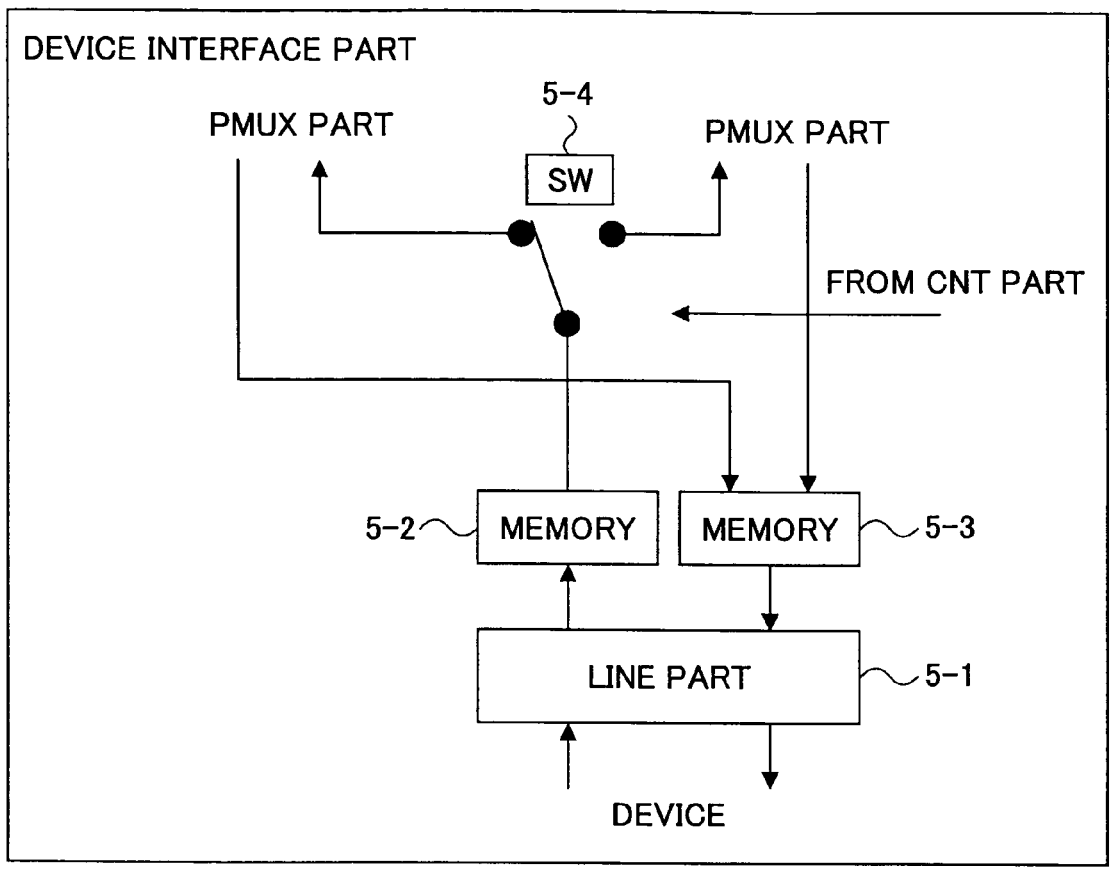
FIG. 10 is a block diagram showing an exemplary structure of a device interface part.

FIG. 10 shows an exemplary structure of the device interface part. The device interface part 4-30, more or less similar to that of the line interface part, includes: a line part 5-1 which has a physical interface conversion part and a frame separation/generation part; a memory 5-2 which stores transmission data that are to be transmitted to the network transmission channel; a memory 5-3 which stores data received from both directions of the bidirectional network transmission channel;

and a switch 5-4 which switches between the destination packet multiplex parts (PMUX) so that the transmission data are transmitted in either one of the directions.

The switch (SW) 5-4, based on the address of the destination node to which data are to be transmitted and the information on the node arrangement provided from the control part (CNT), determines either one of the directions (lines) of the bidirectional network transmission channel on which the destination node is situated, and switches the output of the memory 5-2, storing data to be transmitted, to the packet multiplex part (PMUX) of the determined direction (line).

Figure 11A:
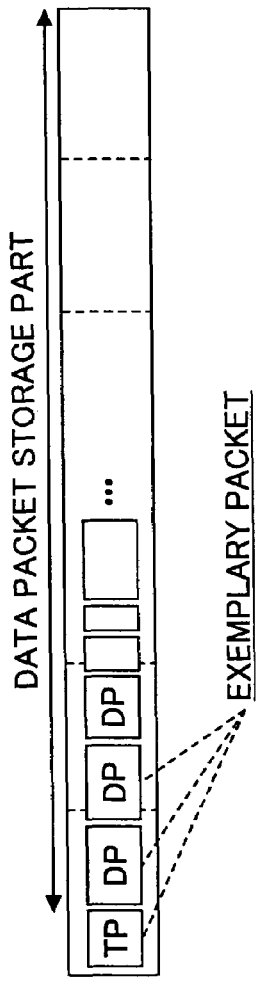
FIGS. 11A, 11B and 11C include data diagrams for explaining an exemplary structure of a packet trailer, a packet, a logic structure of a communication channel and a packet trailer transmittal direction.

FIG. 11A shows an exemplary structure of a packet trailer generated from the trailer generation part, and delivered from the transmission channel. The token packet (TP) is mounted at the head of the packet trailer, and data packets (DP) transmitted from each of the nodes are sequentially mounted behind the token packet (TP). In addition, control packets (CP) for controlling communications between the nodes are also suitably disposed behind the token packet (TP).

Figure 11B:
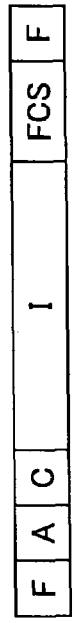

Each packet has a format complying with, for example, HDLC (High-Level Data Link Control procedure), which includes a flag field (F), an address field (A), a control field (C), an information field (I), and a frame check sequence field (FCS), as shown in FIG. 11B.

The control field (C) stores identification information indicating the types of packets (e.g. token packet (TP), data packet (DP), control packet (CP)) and priority information indicating the priority of transmission data. The control part (CNT), based on the priority information, controls the priority of the data to be transmitted, thereby providing a network placing importance on real-time transmission of data.

Figure 11C:
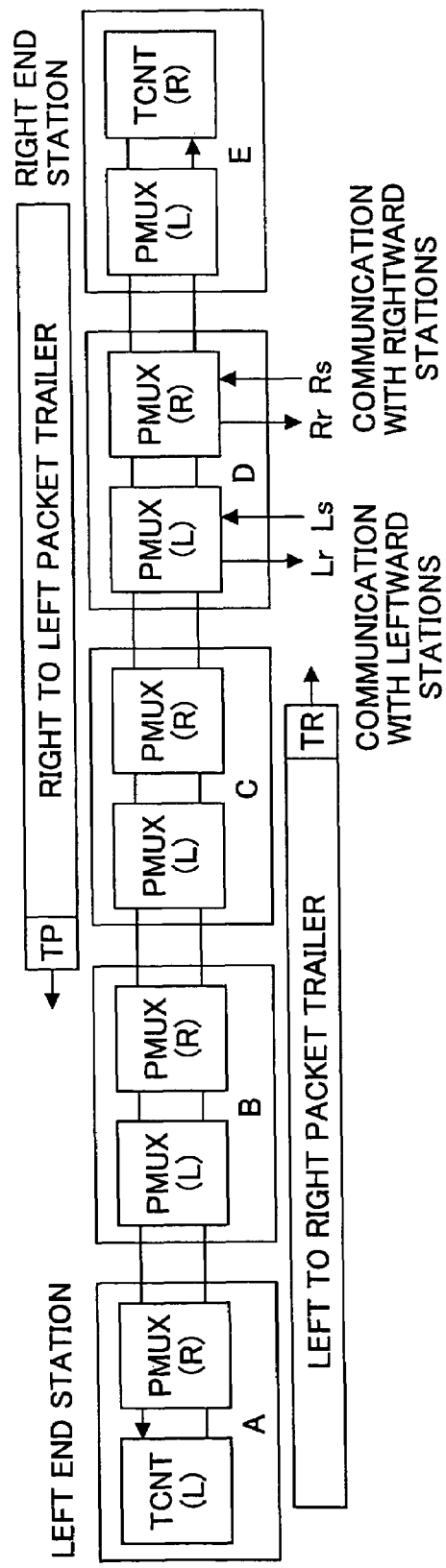

FIG. 11C shows a logical configuration of a communication channel and a transmission direction for a packet trailer. The logical configuration is a linear topology connecting one left end station A, a given number of intermediary stations B through D, and one right end station E, which are disposed on the bidirectional transmission channel. Even where the nodes (stations) are physically connected to form a ring structure, the left and right end stations are chosen from the nodes (stations) in accordance with a station determination rule (described below), to thereby form the logical configuration of the communication channel shown in FIG. 11C.

Here, the packet trailer headed toward left end station A is referred to as "R to L Packet Trailer", and the packet trailer headed toward the right end station E is referred to as "L to R Packet Trailer". Each node mounts the transmission data for the left end station A direction onto the R to L Packet Trailer, and the transmission data for the right end station E direction onto the L to R Packet Trailer.

For example, the data packet to be transmitted from node B to node D is mounted onto the L to R packet trailer, and the data packet to be transmitted from node C to node B is mounted onto the R to L packet trailer. Accordingly, data packets can be independently transmitted through the bidirectional transmission channel, to thereby make efficient use of the bidirectional transmission channel, and thus effectively use transmission capacity. It is to be noted that a multicast data packet, which is to be transmitted to all nodes, is transmitted by being mounted onto the packet trailers of both directions.

Figure 12:
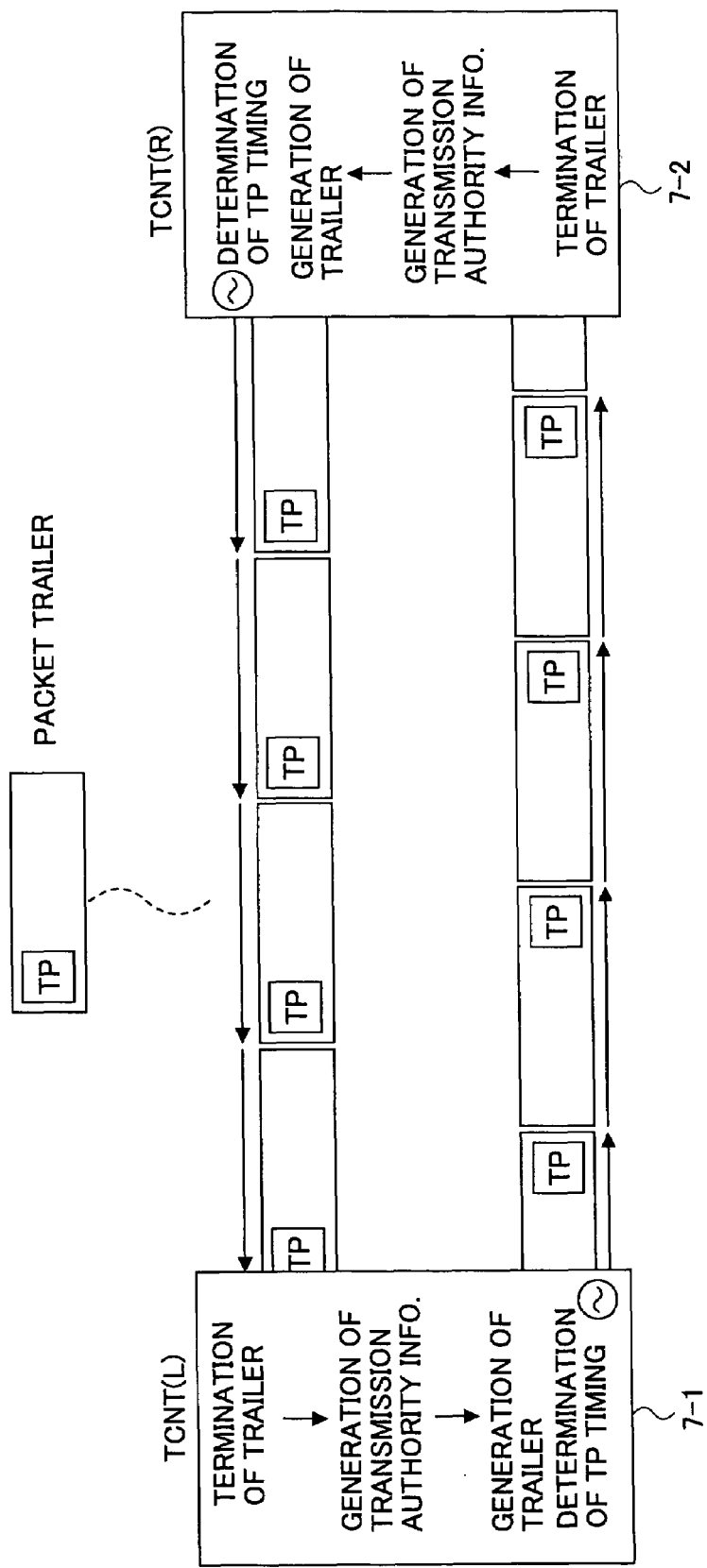
FIG. 12 includes data diagrams for explaining transmission of packet trailers and an operation of a token controller (TCNT)

FIG. 12 describes the transmission of packet trailers and the operation of the token controllers (TCNT). In this example, packet trailers are successively transmitted, in a manner without overlapping with each other on the network transmission channel, from the left token controller (TCNT-L) 7-1 and the right token controller (TCNT-R). 7-2. Each packet trailer, upon reaching the destination token controller (TCNT) on the opposite side, is terminated and discarded by the destination token controller.

When the packet trailer reaches the left token controller (TCNT-L) 7-1 and the right token controller (TCNT-R) 7-2, the left token controller (TCNT-L) 7-1 and the right token controller (TCNT-R) 7-2 discard the data packets (DP) in the packet trailer, then extract transmission authority request information from the token packet (TP), then generate new transmission authority request information based on the extracted transmission authority request information, and then generate a token packet (TP) including the new transmission authority request information.

Then, the left token controller (TCNT-L) 7-1 and the right token controller (TCNT-R) 7-2, each determine the timing for transmitting the token packet (TP) according to the frame timing signal from the line interface part. According to the determined timing, packet trailers having the token packet mounted thereon are successively transmitted onto the network transmission channel via the packet multiplex parts (PMUX).

Figure 13A:
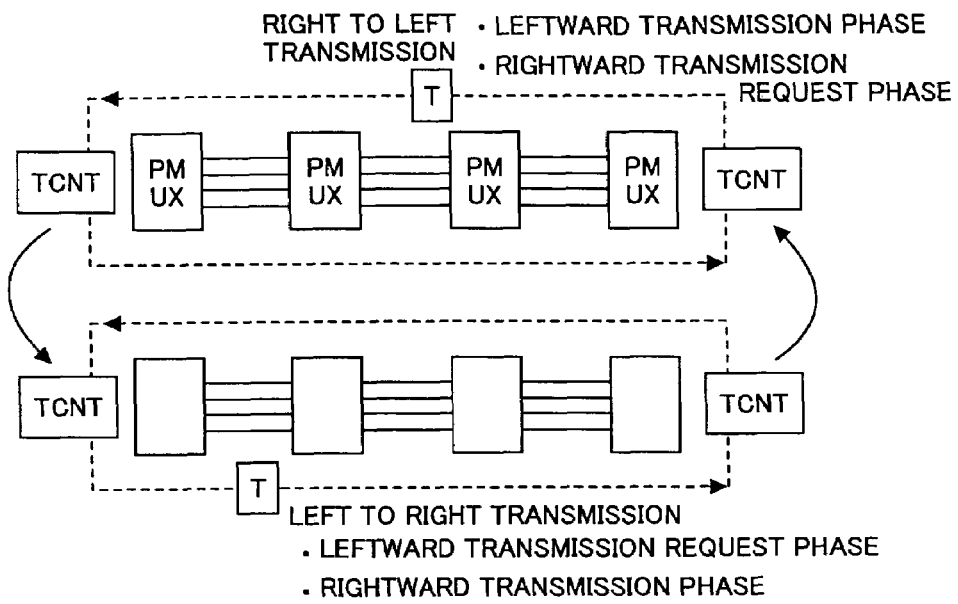
FIGS. 13A through 13C are schematic diagrams for explaining data packets transmitted from each node by a packet trailer.
Figure 13B:
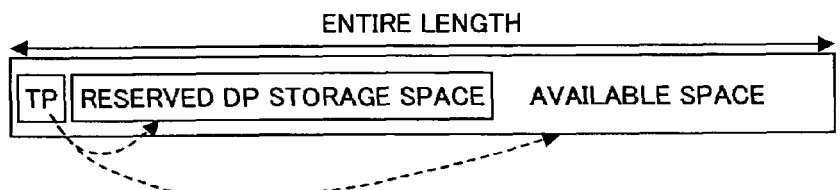
Figure 13C:
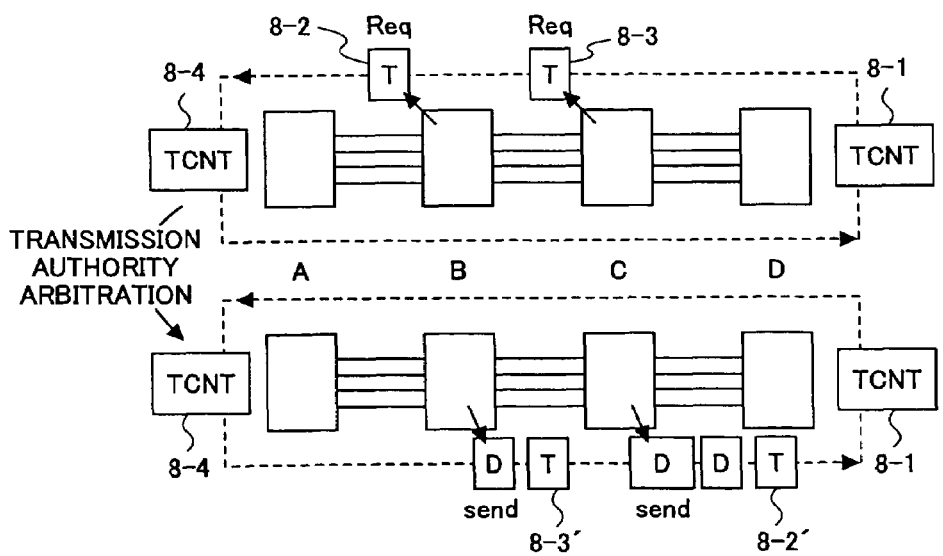

FIGS. 13A through 13C describe data packets transmitted from each node with the packet trailers. FIG. 13A shows a token packet revolving around the network transmission channel, wherein the leftward data packets are mounted behind the token packet (T) on the leftward packet trailer and transmitted leftward (leftward transmission phase), and furthermore, transmission authority request information for transmitting rightward data packets are added onto the token packet (T) heading from the right to the left (rightward transmission authority request phase).

In the same manner, the rightward data packets are mounted behind the token packet (T) on the rightward packet trailer and transmitted rightward (rightward transmission phase), and furthermore, transmission authority request information for transmitting leftward data packets are added to the token packet (T) heading from the left to the right (leftward transmission authority request phase).

That is, in transmitting data packets, the transmission authority request information is mounted onto the token packet (T) heading in the direction opposite to the transmission direction. The token controller (TCNT), having received the transmission authority request information, performs transmission authority arbitration among the nodes based on, for example, priority. The token controller (TCNT) reserves a space beforehand for mounting the data packet (DP) of the node that has acquired transmission authority, to thereby generate and transmit a packet trailer provided with the reservation space, as shown in FIG. 13(B). Accordingly, by performing the transmission authority arbitration and obtaining the reservation space, communications satisfying QOS (Quality of Service) can be attained, and real-time data communications can be performed.

FIG. 13(C) is a drawing for describing data packets being transmitted in a rightward direction. First, leftward token packets (TP) 8-2, 8-3, being initialized and generated by the right token controller (TCNT) 8-1, are transmitted leftward on the transmission channel. In a case where the intermediary nodes B and C request to transmit data packets in the rightward direction, the nodes B and C mount transmission authority request information REQ (its own node address, priority, transmission data size) onto the token packets (TP) 8-2, 8-3 heading in the leftward direction. The left token controller (TCNT) 8-4 performs transmission authority arbitration based on the transmission authority request information REQ. Accordingly, the left token controller (TCNT) 8-4 mounts information on the granted transmission authority and information on the reserved space onto the token packets (TP) 8-2', 8-3'. Then, the nodes B and C determine the amount of data to transmit based on the reservation space information mounted on the token packets (TP) 8-2', 8-3', mount data packets (DP) of the transmission data onto the reservation space of the packet trailer, and transmit the data packets (DP) in the rightward direction.

FIG. 14 shows an exemplary structure of a token packet. In the token packet, the information field I stores management information including, for example, addresses of the right and left end stations and the length of the packet trailers. Furthermore, the information field I stores a right to left transmission authority map part and a left to right transmission authority map part including, for example, transmission authority information of each node (station) (e.g. station address, priority transmission data size, non-priority transmission data size) and available space size of the packet trailer.

Next, a data transmission rule of each of the nodes is described with reference to FIG. 15. For example, in a case where an intermediary station C wishes to transmit data in a rightward direction, the intermediary station C, in order to request reservation of transmission authority, is required to wait for the arrival of a token packet heading leftward while waiting for the arrival of a packet trailer heading rightward (See (1) in FIG. 15).

Figure 15:
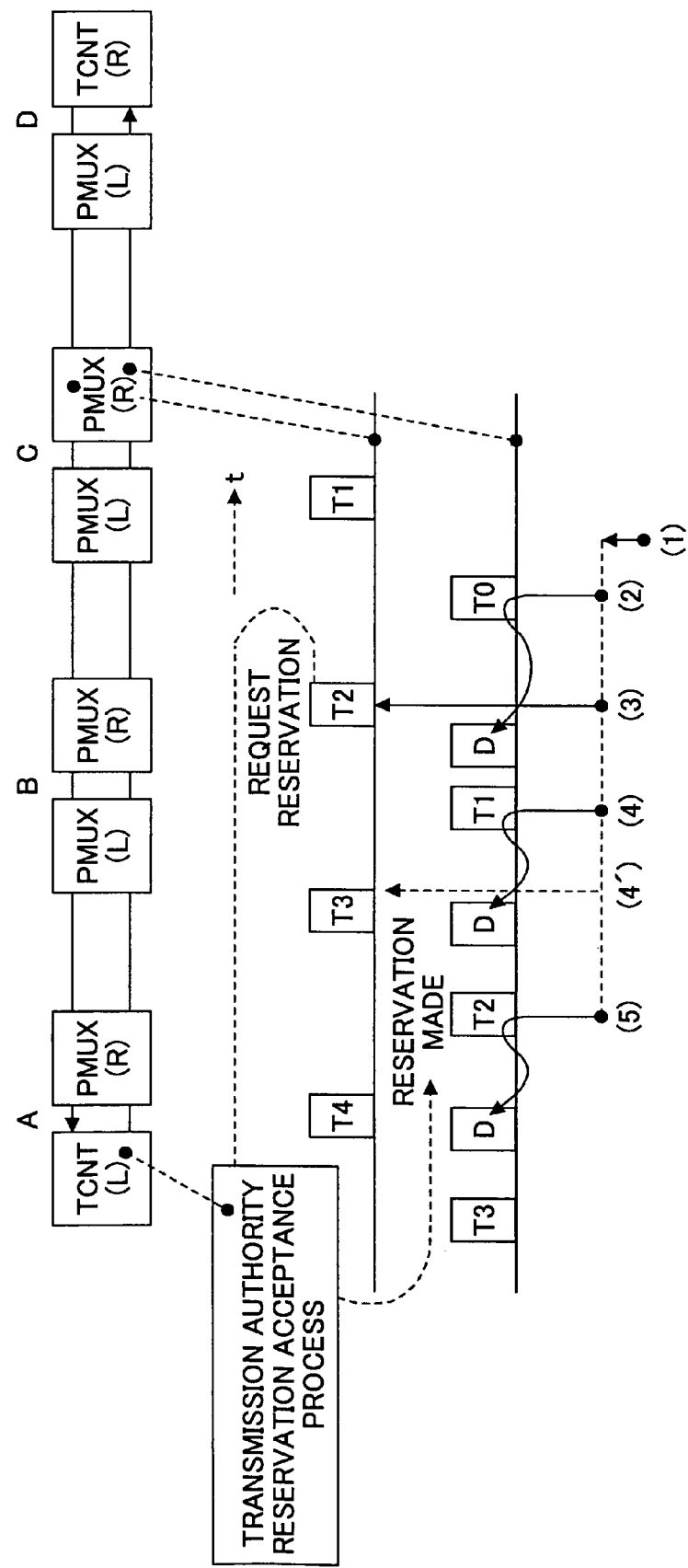
FIG. 15 is a schematic diagram for explaining a rule for transmitting data packets from each node.

Here, when the intermediary station C detects arrival of a token packet TP0 in a packet trailer heading rightward before detecting the arrival of the token packet heading leftward (See (2) in FIG. 15), the intermediary station C determines whether there is available space in the packet trailer. If there is available space in the packet trailer, the intermediary station C is able to transmit data packet DP by obtaining the available space (reservation-less transmission).

On the other hand, in a case where the data packet DP is not transmitted, the intermediary station C, upon detecting the arrival of the token packet TP2 heading leftward (See (3) in FIG. 15), appends a request for reserving transmission authority to the token packet TP2. When the intermediary station C detects a token packet TP1 heading rightward (See (4) in FIG. 15) during a period between when the token packet TP2 reaches the left end station A and when the packet trailer including the token packet TP2 heading rightward reaches the intermediary station C via the left end station A (having performed a process of arbitrating transmission authority and a process of accepting reservations), the intermediary station C determines whether there is available space in the packet trailer including the token packet TP1. If there is available space in the packet trailer, the intermediary station C is able to transmit data packet DP by obtaining the available space (post-reservation reservation-less transmission).

Even when a token packet TP3 heading leftward arrives after appending the request onto the token packet TP2 (See (4') in FIG. 15), the intermediary station C is not allowed to doubly (overlappingly) append a request for reserving transmission authority onto the token packet TP3 (forbiddance of over-booking).

When the intermediary station C detects the arrival of the token packet TP2 heading rightward after the request for reserving transmission authority has been accepted (See (5) in FIG. 15), the intermediary station C stores and transmits the data packet into the reserved space in the packet trailer of the token packet TP2 (reservation transmission).

It is to be noted that in a case where there is no remaining data required for transmission after the data packet DP has been transmitted in the post-reservation reservation-less transmission (See (4) in FIG. 15), the intermediary station C cancels the reservation of the token packet TP2 heading rightward, and passes over the reserved space to a subsequent intermediary station. In a case where there are remaining data required for transmission, the remaining data DP can be transmitted using the reserved space.

Upon receiving a data packet addressed to itself, each intermediary station discards the data packet so that the space previously occupied by the data packet can be made available and passed over to a subsequent intermediary station. Accordingly, the network transmission channel can be effectively utilized.

Furthermore, by appending a request attribute indicative of the degree of priority (priority/no-priority) onto the transmission authority reservation request information, the transmission authority reservation request having priority appended thereto can be preferentially accepted in the transmission authority arbitration process by the token controller even in a case where transmission authority reservation requests surpass the capacity of the packet trailer.

Therefore, in a case of transmitting data packets in a communication service emphasizing real-time performance, transmission authority can be preferentially granted for transmitting the data packet by transmitting a transmission authority reservation request appended with priority. This enables such real-time communication service to be achieved with neither delay of transmission nor discarding of data.

Meanwhile, a transmission authority reservation request having no priority appended thereto is rejected in the transmission authority arbitration process by the token controller in a case where transmission authority reservation requests surpass the capacity of the packet trailer. In this case, the data requested for transmission is either made to wait or discarded. This kind of communication may be applied in communicating with a protocol such as TCP (Transmission Control Protocol) where little emphasis is made on real-time performance and where re-transmittal of discarded data may be requested.

With the foregoing transmission rules and transmission authority arbitration process, a reservation space for storing transmission data to be transmitted by a node granted with the transmission authority can be obtained beforehand, and data transmission can be performed by effectively utilizing the available space in addition to the reservation space. Furthermore, by appending the transmission authority request attribute indicative of the degree of priority, the transmission capacity of the double ring transmission channel can be utilized to its full extent and achieve efficient data communications. In addition, the foregoing communication techniques can be satisfactorily applied to media communications emphasizing real-time performance and/or high quality.

Next, a process where each node (station) identifies the arrangement of the stations is described with reference to FIG. 16. Each node identifies the arrangement of the stations by using a transmission authority map in the token packet (TP). Both a left to right transmission authority map part 11-1 in the leftward token packet (TP) and a right to left transmission authority map part 11-2 in the rightward token packet (TP) are provided with a station arrangement information storage part.

Each node, starting from the end station node being the origin of the token packet (TP), successively stores its own station address into the station arrangement information storage part in the token packet (TP) and transfers the token packet (TP) to the next node. While at the same time, each node (station) is able to identify the arrangement of the stations by reading out the station arrangement information stored in the transmission authority map in the token packet (TP) transmitted in both directions.

Figure 16:
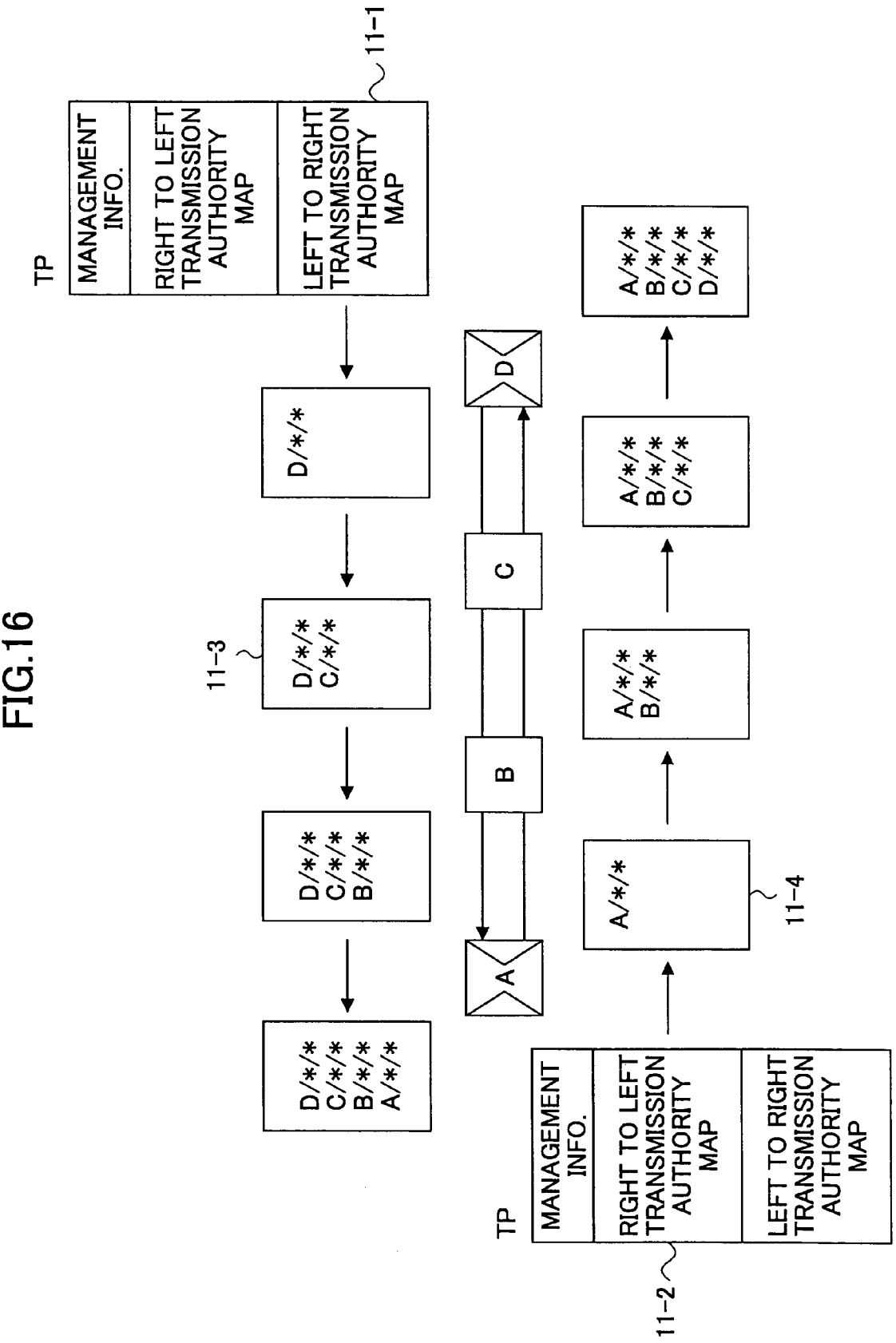
FIG. 16 is a schematic diagram for explaining a procedure of identifying the arrangement of each node (station)

In the example shown in FIG. 16, the node B is able to identify that nodes C and D are arranged on its right side since the addresses of the nodes C and D are stored in the left to right transmission authority map part 11-3 in the leftward token packet (TP). Furthermore, the node B is able to identify that node A is arranged on its left side since the address of node A is stored in the right to left transmission authority map part 11-4 in the rightward token packet (TP).

By enabling each node (station) to identify the arrangement of the stations, each node, upon transmitting data packets to a destination node (station), is able to determine the direction of the token packet for transmitting the transmission authority reservation request, and the direction of the packet trailer for storing the data packets therein.

Next, a RAS function which actively and automatically switches the connection channel during disorder is described.

Each station monitors the reception of transmission frames, and also for abnormal transmission of its own station. Each station exchanges monitoring information with the other stations, so that each station is able to autonomously determine to either become an end station (master node) or an intermediary station (slave node) and set a network channel that avoids a malfunctioned transmission channel in accordance with a network channel switching rule (described below).

The network channel switching rule (RAS-r0 through RAS-r7) is described below.

RAS-r0: In initiation, all nodes become an end station (master node), and transmit an end station notification frame (including master node ID).
RAS-r1: The station which receives no data from a frame from upstream becomes the end station (master node).
RAS-r2: The master station becomes the intermediary station (slave node) in a case of receiving end station notification frames from two different master nodes situated upstream in each of the two systems.
RAS-r3: The master station remains a master station when ranked as a high rank station, and becomes an intermediary station when ranked as a low rank station in accordance with a predetermined ranking in a case of receiving end station notification frames from the same master node situated upstream in each of the two systems (case of overlapped master node). For example, in a case where the ranking is in an order of: node A>node B>node C>node D; node A is the highest ranked node.
RAS-r4: A node receiving no data frame from a side of the transmission channel transmits a master persuasion frame in the downstream direction of the transmission channel of the other side.
RAS-r5: The station receiving the master persuasion frame from only one upstream side of the system becomes the master station.
RAS-r6: The station receiving master persuasion frames from both upstream sides of the system does not become the master (a case where stations situated on both sides are master nodes).
RAS-r7: A node receiving a data frame from upstream eliminates the rule RAS-r4, and ceases the transmission of the master persuasion frame.

Figure 17:
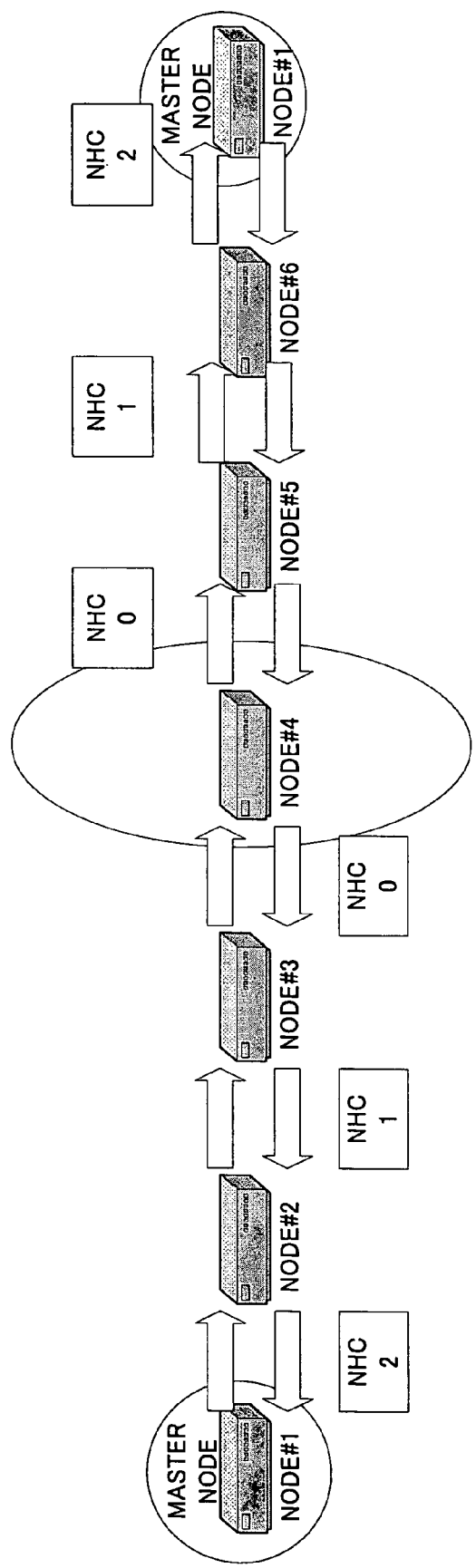
FIG. 17 is a schematic diagram showing an exemplary structure of a ring network for explaining a method according to an embodiment of the present invention.

FIG. 17 shows an exemplary structure of a ring network for explaining a method according to an embodiment of the present invention. In FIG. 17, the ring network is formed of node #1 through #6. Since the ring network is illustrated in a spread out manner, node #1 is shown on both ends of the network.

Here, in this example, node #4 is disposed at a branch location, and the remaining nodes #1 through #3, node #5, and node #6 are disposed at observation locations, wherein image data are transferred from the nodes #1 through #3, node #5, and node #6 to the node #4. In this example, a control device or the like is connected to node #4 for setting node #4 as a head of the nodes (i.e. main station) (HON_set). By setting node #4 as the head of the nodes, a control packet (CP) shown in FIG. 18 is transmitted in sent to the rightward line and the leftward line from the node #4.

Figure 18:
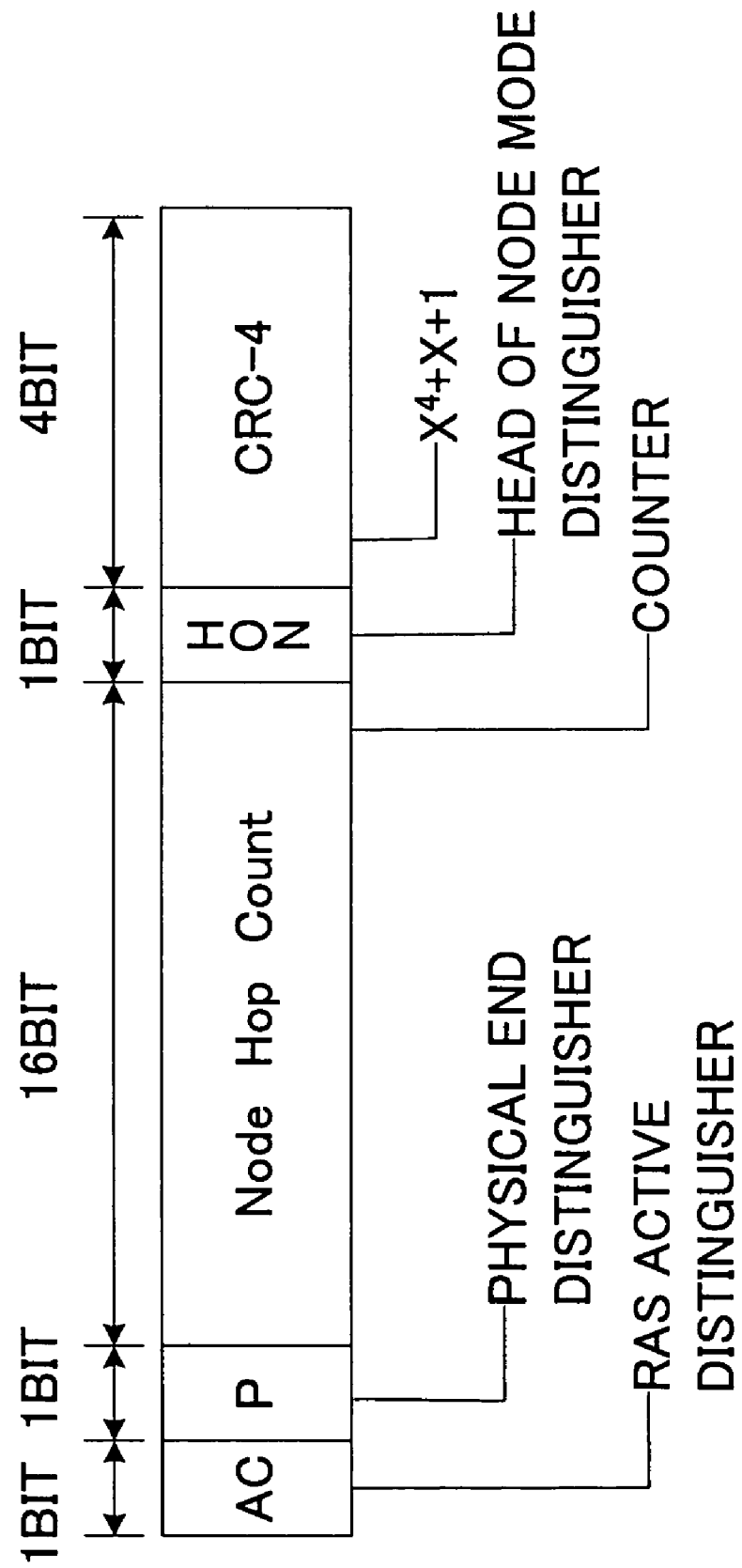
FIG. 18 is a data diagram showing an exemplary structure of a control packet.

FIG. 18 shows an exemplary configuration of an information field I (according to HDLC) of the control packet (CP) according to an embodiment of the present invention. In FIG. 18, RAS active distinguisher (AC) indicates whether to operate using a RAS function. Physical end distinguisher (P) indicates whether a node itself is an end station. Node Hop Count (NHC) stores the number of nodes counted from the head of the nodes to its own node. HON mode distinguisher indicates whether a mode is in a mode for setting a master node. CRC-4 stores error detection codes of the information field I. The control packet (CP) is generated by the node that is set as the head of the nodes. In this case, NHC=0, and the control packet (CP) is transmitted to both the rightward and leftward lines. The control packet makes one revolution around the ring network, and terminates at the node that is set as the head of the nodes.

Figure 19:
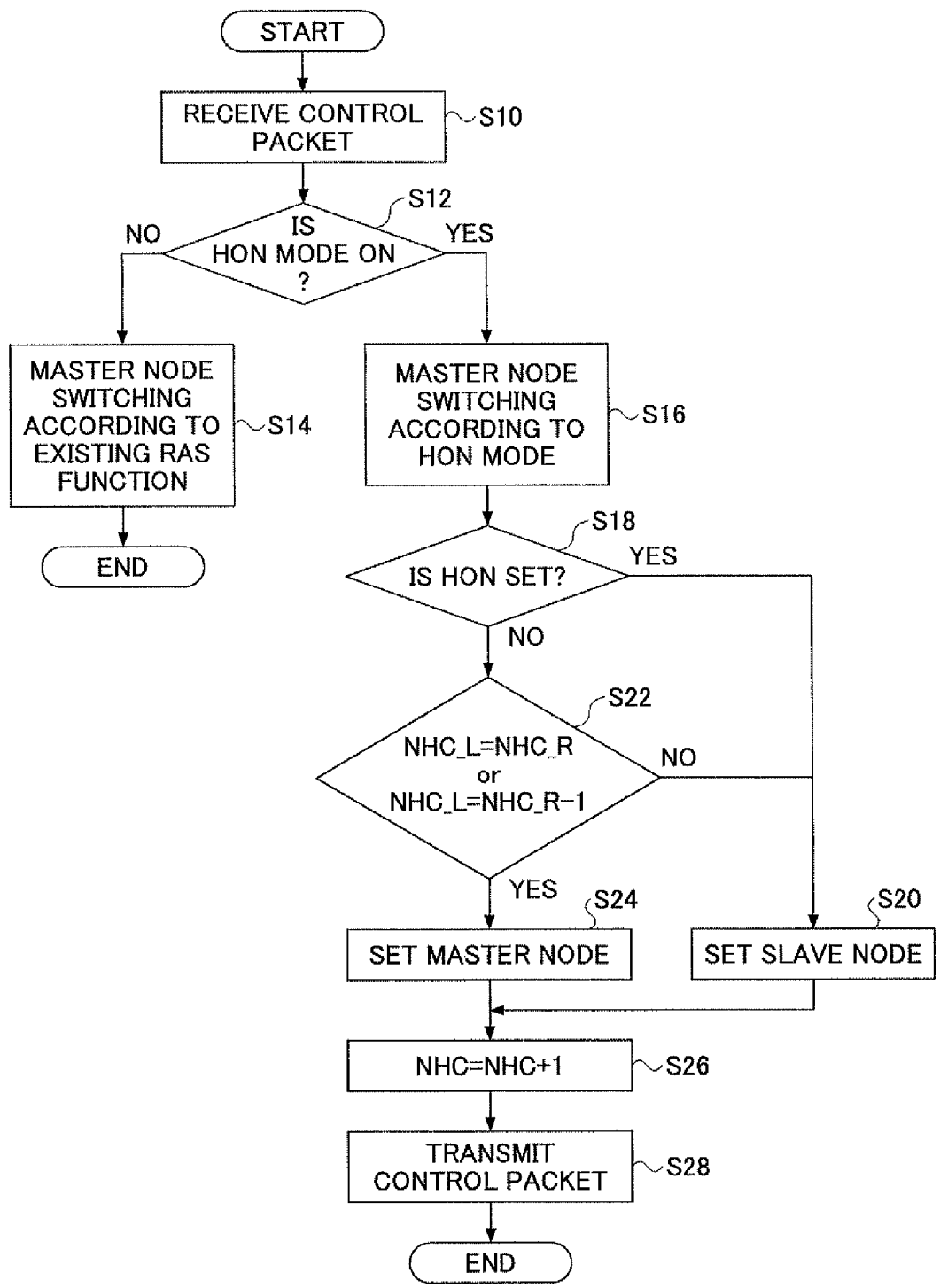
FIG. 19 is a flowchart of a master setting process.

FIG. 19 shows a flowchart of a master node setting process which is performed by the control part (CNT) 31 of each node. In Step S10 of FIG. 19, a node receives a control packet (CP) from the network. In Step S12, the control part 31 of the node determines whether the HON mode determination is ON. When the HON mode determination is OFF (S12 NO), the control part 31 sets the node to perform switching of the master node according to an existing RAS function (Step S14). When the HON mode determination is ON (S12 YES), the control part 31 sets the node to perform switching of the master node according to the HON mode (Step S16). Next, the control part 31 determines whether the HON is set (Step S18). When the HON is set (S18 YES), the control part 31 sets its own node as a slave node (Step S20).

Meanwhile, when the HON is not set (S18 NO), the control part 31 compares the number of the NHC in the control packet received from the rightward line (NHC_R) and the number of the NHC in the control packet received from the leftward line (NHC_L), and determines whether NHC_L=NHC_R or NHC L=NHC R-1 is satisfied (S22 YES). When either NHC_L=NHC_R or NHC L=NHC R-1 is satisfied, the control part 31 set its own node as a master node (Step S24). If neither NHC_L=NHC_R nor NHC L=NHC R-1 is satisfied (S22 NO), the control part 31 sets its own node as the slave node (Step S20). If the node receives a control packet from only one of the rightward or leftward lines, the control part 31 sets its own node as the slave node since this is a state where NHC_L≠NHC_R and NHC_L≠NHC_R-1 (S22 NO).

Subsequent to the Step S20 or Step S24, the NHC in the received control packet is incremented by 1 (Step S26). Then, the control packet is transmitted either to the rightward or leftward line (Step S28).

Figure 20:
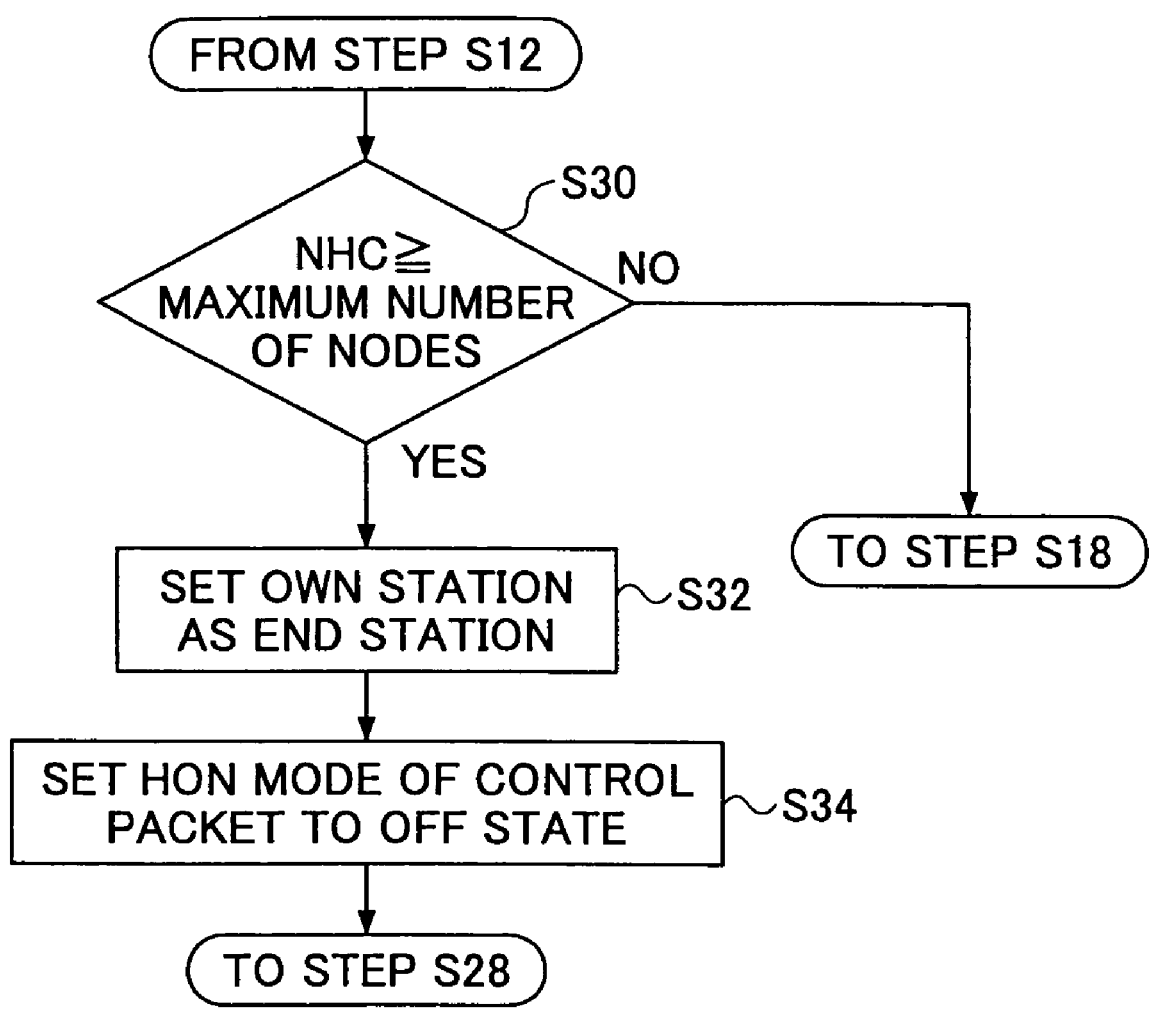
FIG. 20 is a flowchart of an error prevention process.

As shown in the flowchart of FIG. 20, an error prevention process may be included for a case where a failure occurs at a node set as the HON, and where a node is disconnected from the network without the performing of the master node switching process according to the existing RAS function.

This process may be performed, for example, between the Steps S12 and S16. In Step S30, the control part 31 determines whether the number of the NHC in the received control packet is equal to or greater than the maximum number of nodes (e.g. maximum number of nodes=32). The process advances to Step S18, when NHC<maximum number of nodes is satisfied (S30 NO). When NHC≧maximum number of nodes is satisfied (S30 YES), the process advances to S32 where the control part 31 sets its own node (station) as the master node (end station). Then, in Step S34, the control part 31 sets the HON mode of the control packet to an OFF state, and commands the performance of the master node switching according to the existing RAS function. Subsequent to Step S34, the process advances to Step S28 where the control packet is transmitted. When the NHC is equal to or greater than the maximum number of nodes, it can be determined that a terminal function of a terminal device cannot be attained and merely a relay loop is provided. In such case, the normal RAS state is to be recovered.

Figure 21:
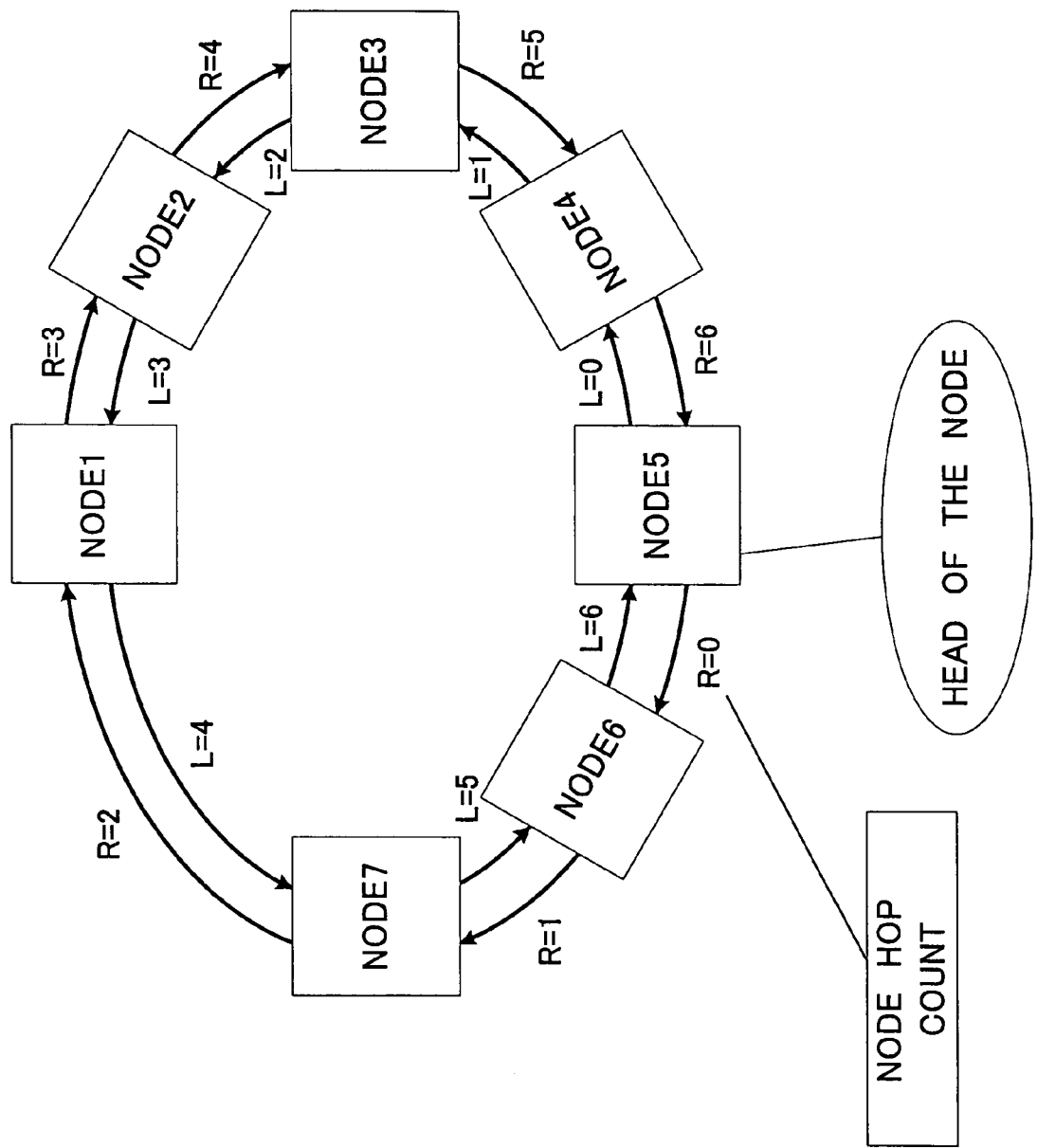
FIG. 21 is a schematic diagram for explaining the setting of a master node in a case where the number of the nodes composing the ring network is an odd number.

FIG. 21 shows an example of a ring network comprising an odd number of nodes #1 through #7 wherein the HOD is node #5. In this example, node #2 becomes the master node since the NHC from the rightward line NHC_R=3, and the NHC from the leftward line NHC_L=2.

Figure 22:
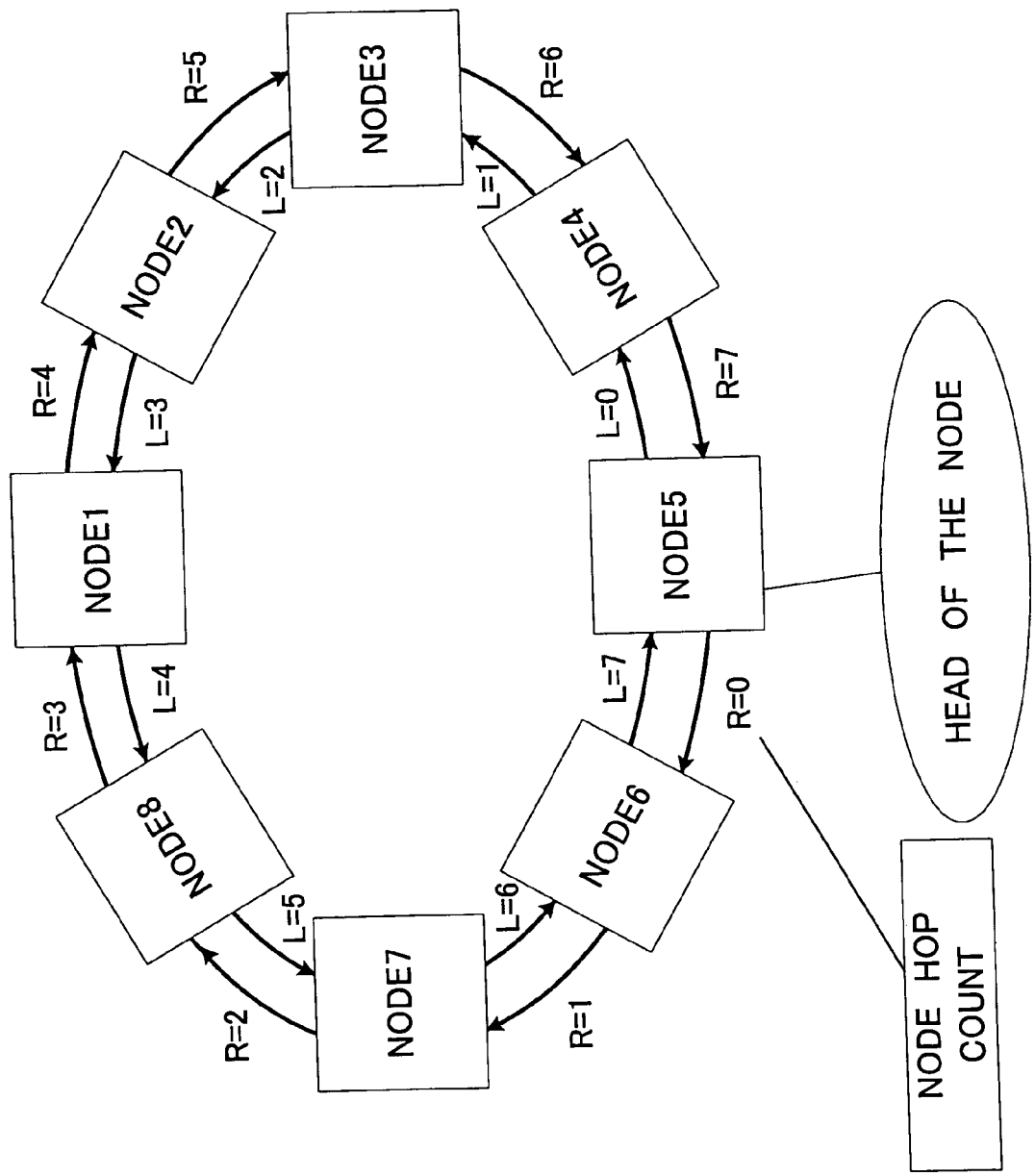
FIG. 22 is a schematic diagram for explaining the setting of a master node in a case where the number of the nodes composing the ring network is an even number.

FIG. 22 shows an example of a ring network comprising an even number of nodes #1 through #8 wherein the HOD is node #5. In this example, node #1 becomes the master node since the NHC from the rightward line NHC_R=3, and the NHC from the leftward line NHC_L=3.

Accordingly, since the node which is positioned furthest from the node of the HOD at which reception traffic is concentrated becomes the master node, the rightward and leftward lines can be efficiently utilized.

In consequence, according to an embodiment of the present invention, a master node can be set at a position furthest from a node designated as the main station, to thereby enhance transmission efficiency.

Furthermore, in a case where the node that is designated as the main station is a node at which reception traffic is concentrated, a master node can be set at a position furthest from the node at which reception traffic is concentrated, to thereby enhance transmission efficiency.

It is to be noted that Step S26 corresponds to a counting unit described in the claims, Steps S22 and S24 correspond to a master node setting unit described in the claims, and Step 28 corresponds to a control packet transmitting unit described in the claims.

Further, the present invention is not limited to these embodiments, but various variations and modifications may be made without departing from the scope of the present invention.

The present application is based on Japanese Priority Application No.2003-407712 filed on Dec. 5, 2003, with the Japanese Patent Office, the entire contents of which are hereby incorporated by reference.

What is claimed is:

1. A method of setting a master node apparatus of a ring network that has adjacently connected node apparatuses situated on rightward and leftward lines of a bidirectional transmission channel, the method comprising:

counting the number of node interposed between a designated node apparatus and each node apparatus other than the designated node apparatus on the rightward and leftward lines of the bidirectional transmission channel; and setting one of the node apparatuses as the master node apparatus;

wherein the master node apparatus satisfies a relation of, NHC_L =NHC_R or NHC_L =NHC_R-1, wherein NHC_L is the number of interposed node apparatuses counted from the leftward line, and NHC_R is the number of interposed node apparatuses counted from the rightward line;

wherein the designated node apparatus is a node apparatus at which reception traffic is concentrated.

2. A node apparatus in a ring network that has adjacently connected node apparatuses situated on rightward and leftward lines of a bidirectional transmission channel, the node apparatus comprising:

a line interface part corresponding to respective lines of the bidirectional transmission channel and having an input part for inputting packets from the lines of the bidirectional transmission channel and an output part for outputting packets to the lines of the bidirectional transmission channel;

a control packet transmitting unit for transmitting control packets according to the packets received from the line interface part;

a counting unit for counting the number of node apparatuses interposed between the node apparatus and a designated node apparatus on the rightward and leftward lines of the bidirectional transmission channel according to the control packets received from the line interface part; and a master node setting unit for setting the node apparatus as the master node apparatus;

wherein the master node apparatus satisfies a relation of, NHC_L =NHC_R or NHC_L =NHC_R-1, wherein NHC_L is the number of interposed node apparatuses counted from the leftward line, and NHC_R is the number of interposed node apparatuses counted from the rightward line;

wherein the designated node apparatus is one of the node apparatuses at which reception traffic is concentrated.

3. The node apparatus as claimed in claim 2, wherein the designated node apparatus has a control packet generation unit for generating a control packet indicating that the number of interposed node apparatuses for both rightward and leftward lines is 0, and transmitting the control packet to each of the rightward and leftward lines of the bidirectional transmission channel.

4. The node apparatus as claimed in claim 3, wherein the control packet transmitting unit is configured to increment by a value of 1 the number of interposed node apparatuses of the respective control packets received from the rightward and leftward lines, and to transmit the incremented control packets to the rightward and leftward lines, respectively.

5. The node apparatus as claimed in claim 2, wherein the master node setting unit sets the node apparatus as the master node apparatus when the number of interposed node apparatuses is equal to or greater than a prescribed value.

* * * * *

UNITED STATES PATENT AND TRADEMARK OFFICE
CERTIFICATE OF CORRECTION

PATENT NO. : 7,613,839 B2
APPLICATION NO. : 10/856653
DATED : November 3, 2009
INVENTOR(S) : Inomoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1524 days.

Signed and Sealed this

Nineteenth Day of October, 2010

David J. Kappos
*Director of the United States Patent and Trademark Office*